(12) United States Patent
Mihara et al.

(10) Patent No.: US 8,553,031 B2
(45) Date of Patent: Oct. 8, 2013

(54) DISPLAY DEVICE, EYEWEAR DEVICE AND VIDEO SYSTEM

(75) Inventors: Kazuhiro Mihara, Osaka (JP); Katsuo Saigo, Hyogo (JP); Keisuke Suetsugi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/611,769

(22) Filed: Sep. 12, 2012

(65) Prior Publication Data

US 2013/0002664 A1 Jan. 3, 2013

Related U.S. Application Data

(63) Continuation of application No. PCT/JP2012/000439, filed on Jan. 24, 2012.

(60) Provisional application No. 61/439,546, filed on Feb. 4, 2011.

(30) Foreign Application Priority Data

Jul. 6, 2011 (JP) ................................. 2011-150136

(51) Int. Cl.
*G06T 15/00* (2011.01)

(52) U.S. Cl.
USPC .................. 345/419; 348/47; 348/56; 349/13; 375/354

(58) Field of Classification Search
USPC .......... 345/419; 348/47, 56; 349/13; 375/354
See application file for complete search history.

(56) References Cited

U.S. PATENT DOCUMENTS

| 6,791,599 | B1 | 9/2004 | Okada et al. | |
|---|---|---|---|---|
| 8,233,103 | B2 * | 7/2012 | MacNaughton et al. | ....... 349/13 |
| 8,274,552 | B2 * | 9/2012 | Dahi et al. | ....... 348/47 |
| 8,311,169 | B2 * | 11/2012 | Okumura et al. | ............. 375/354 |
| 2011/0102561 | A1 | 5/2011 | Ichihashi | |
| 2011/0134231 | A1 | 6/2011 | Hulvey et al. | |

FOREIGN PATENT DOCUMENTS

| JP | 8-317426 | 11/1996 |
|---|---|---|
| JP | 11-98538 | 4/1999 |
| JP | 2000-36969 | 2/2000 |
| JP | 2011-118351 | 6/2011 |
| WO | 2011/052125 | 5/2011 |

OTHER PUBLICATIONS

International Search Report issued Apr. 3, 2012 in International (PCT) Application No. PCT/JP2012/000439.

* cited by examiner

*Primary Examiner* — Phu K Nguyen
(74) *Attorney, Agent, or Firm* — Wenderoth, Lind & Ponack, L.L.P.

(57) ABSTRACT

The instant application describes a display device for switching a display mode between a first display mode for displaying a stereoscopic image with an eyewear device, and a second display mode, which is different from the first display mode. The display device includes a signal generator, which generates a timing signal for notifying a timing of an increasing period of an incident light amount to left and right eyes or a stop signal for stopping the adjustment operation as a control signal, which is transmitted by a transmitter to the eyewear device. The transmitter transmits the timing signal for the first display mode while the image is displayed in the first display mode. If the display mode is then switched from the first to second display mode, the transmitter sequentially transmits the stop signal and the timing signal for the second display mode to the eyewear device.

21 Claims, 15 Drawing Sheets

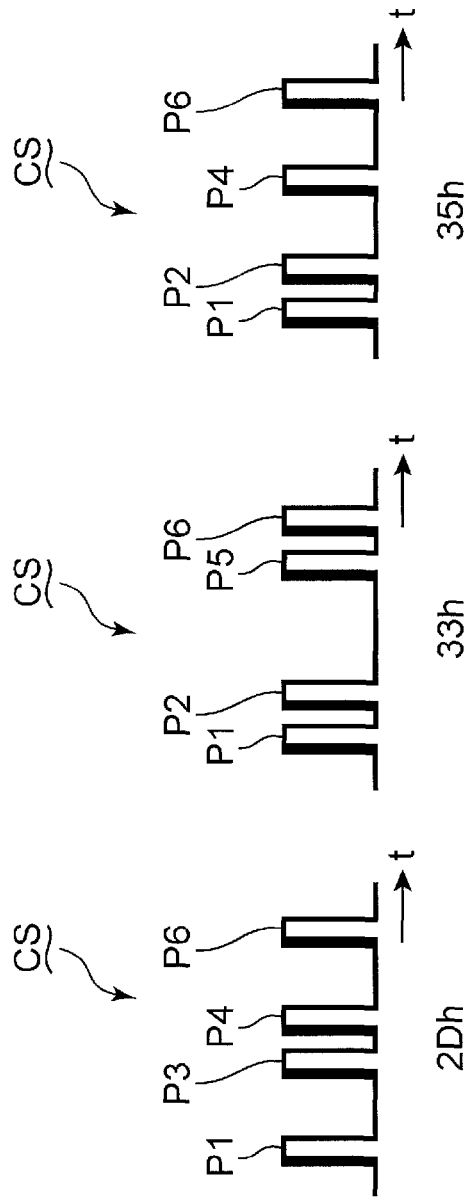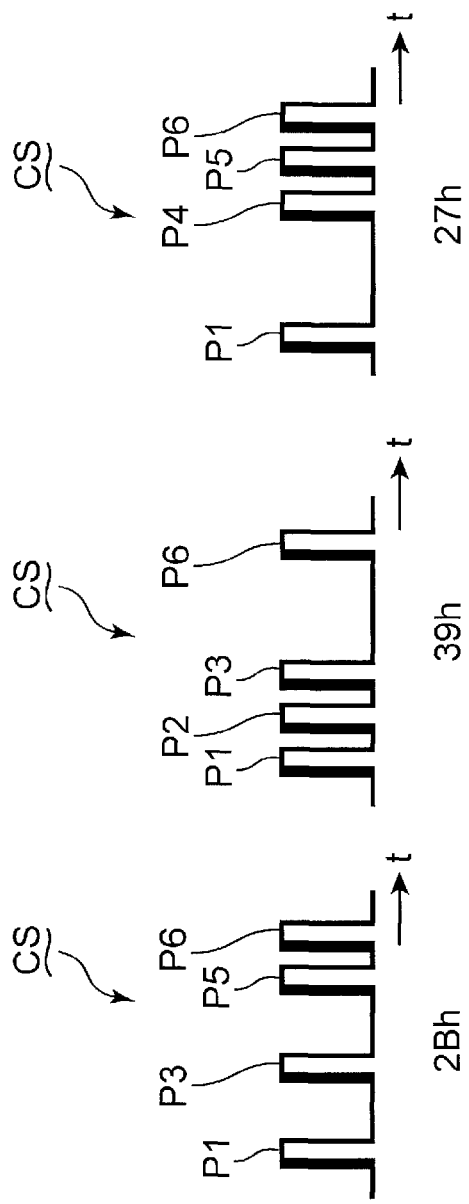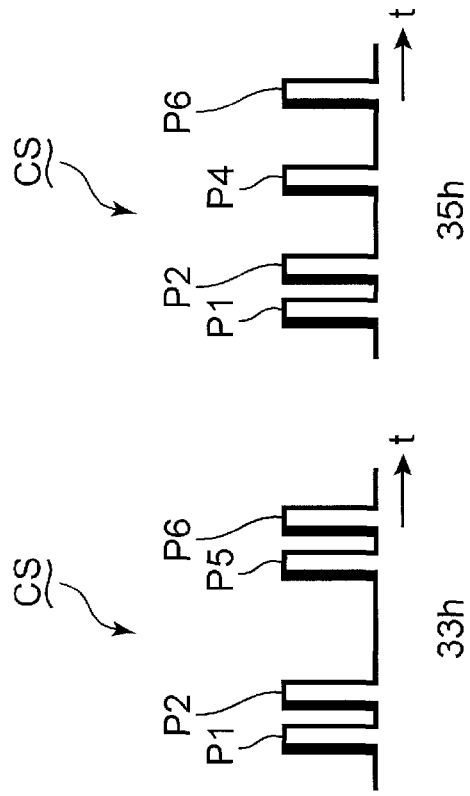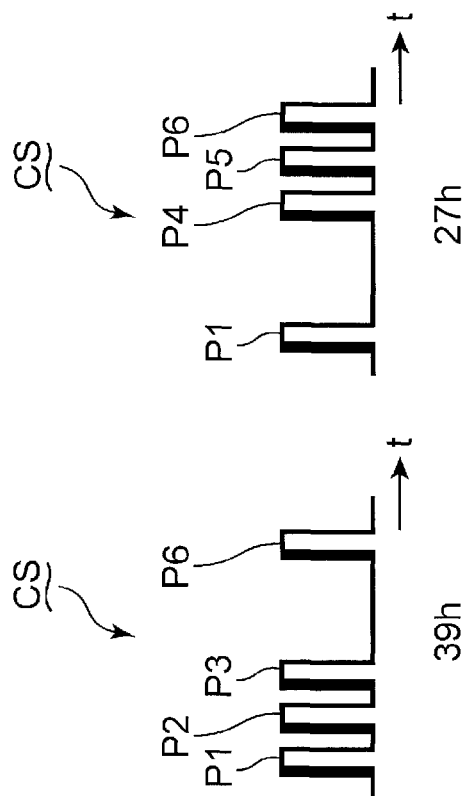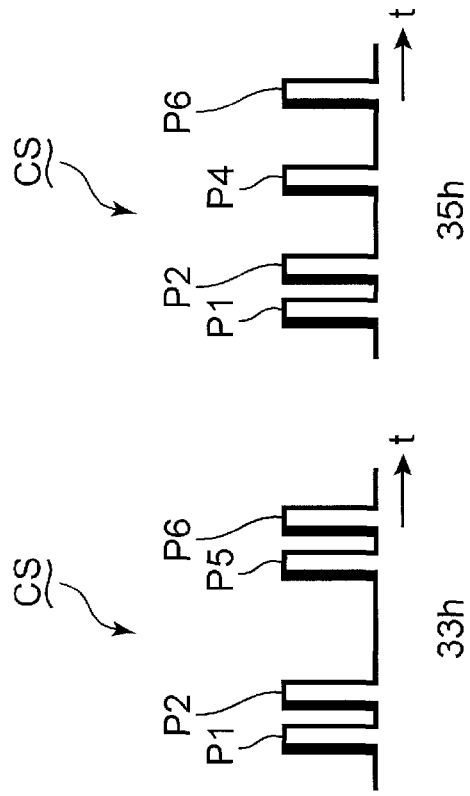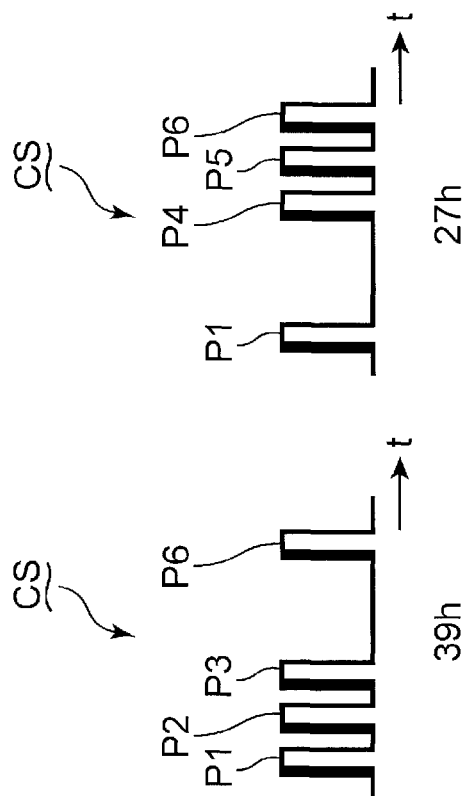

FIG. 11A
FIG. 11B
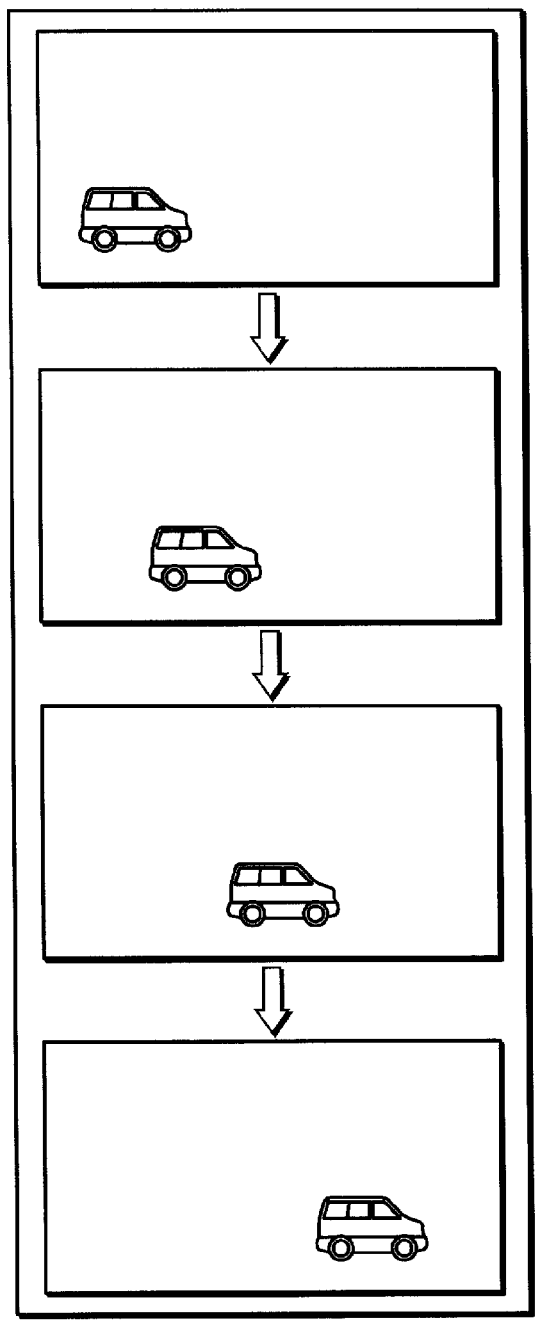
SELECT FIRST VIDEO
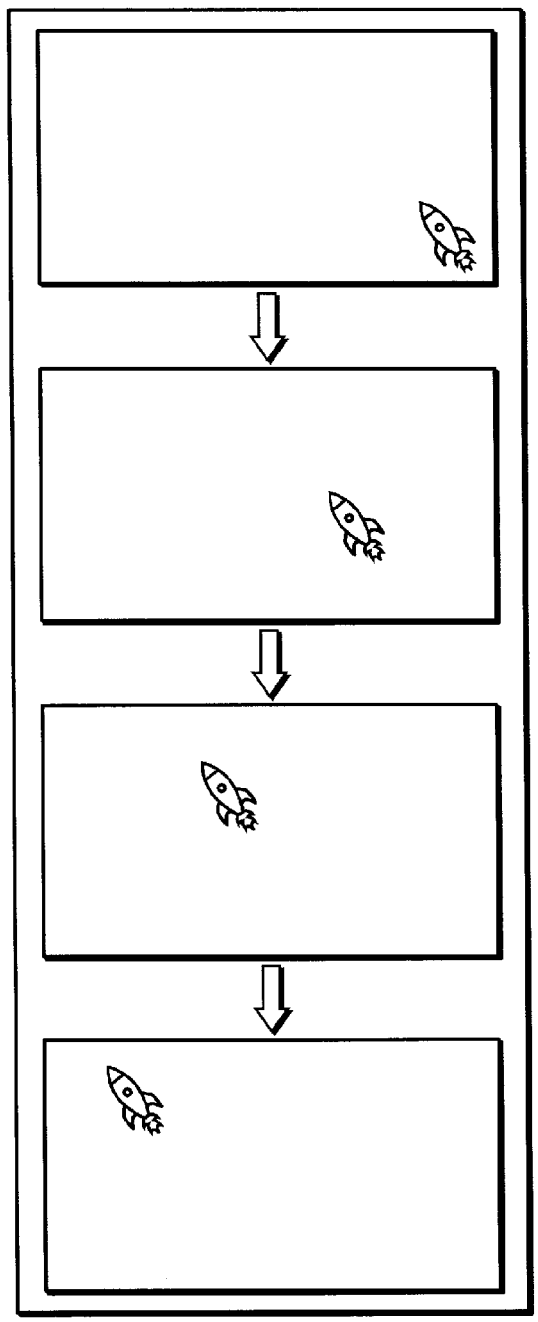
SELECT SECOND VIDEO

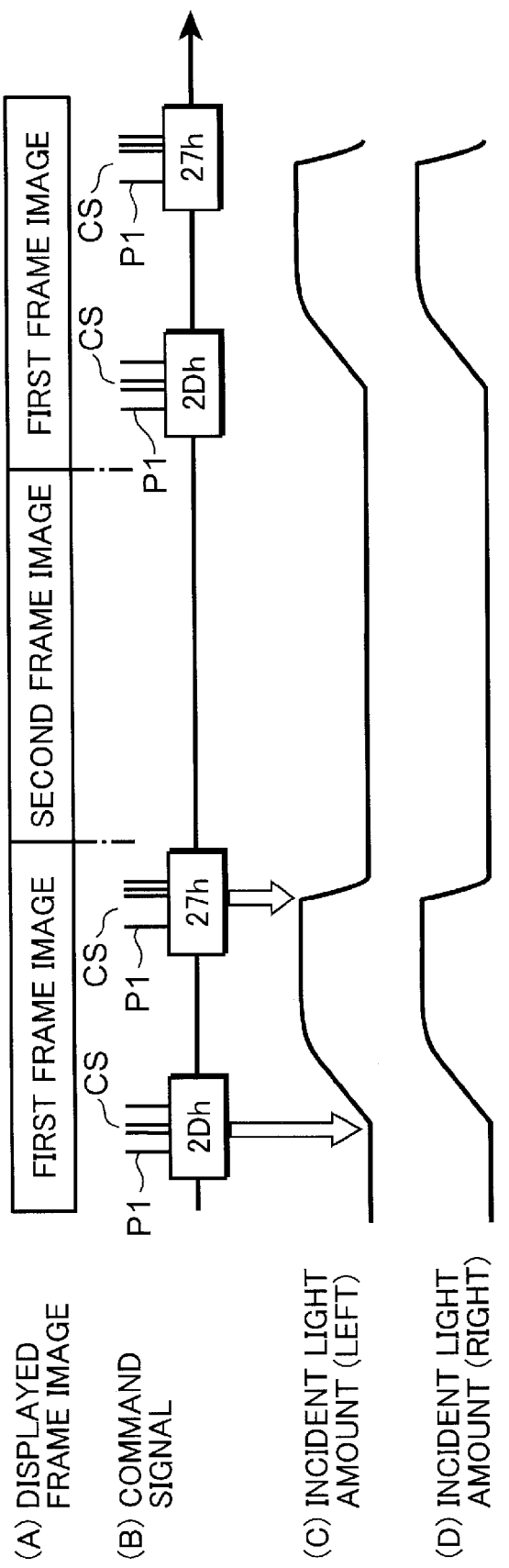

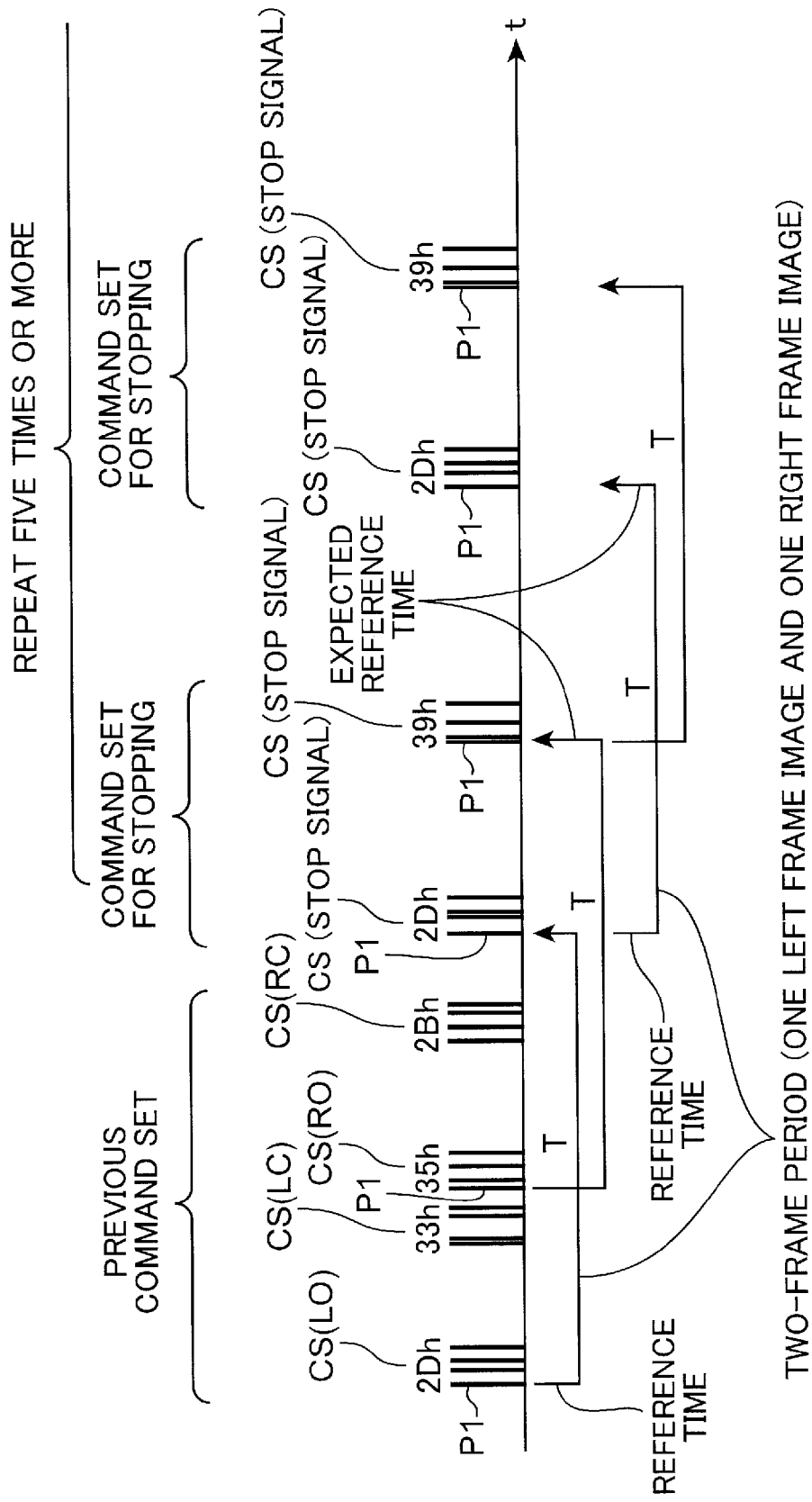

DISPLAY DEVICE, EYEWEAR DEVICE AND VIDEO SYSTEM

This application is a Continuation of International Application No. PCT/JP2012/000439, with the International Filing Date of Jan. 24, 2012, which claims the benefit of U.S. Provisional Application No. 61/439,546, filed Feb. 4, 2011.

TECHNICAL FIELD

The present application relates to a display device for displaying images, an eyewear device for assisting in viewing images, and a video system including these devices.

BACKGROUND

Video systems, which are used to make images stereoscopically perceived, recently become popular. A video system typically includes a display device, which displays stereoscopic images, and an eyewear device, which assists in viewing the images (e.g. Patent Documents 1 and 2). The display device alternately displays a left frame image, which is observed with the left eye, and a right frame image, which is observed with the right eye. The eyewear device includes liquid crystal shutters which open and close in synchronization with display switching operation between the left and right frame images. The liquid crystal shutter situated in front of the left eye opens while the left frame image is displayed, and closes while the right frame image is displayed. A liquid crystal shutter situated in front of the right eye closes while the left frame image is displayed, and opens while the right frame image is displayed. The left and right frame images are different in contents by an amount of parallax. As a result of the aforementioned synchronization operation of the liquid crystal shutters, a viewer recognizes the parallax between the left and right frame images to stereoscopically perceive the displayed images on the display device.

The synchronization between the display device and the eyewear device is controlled by means of infrared rays or radio signals. Since the eyewear device is not physically connected to the display device, a viewer may watch images at a desired position.

An appropriate communication between the display device and the eyewear device is important for the synchronization operation of the liquid crystal shutters with the image display. However, the eyewear device may not sometimes appropriately receive a signal transmitted from the display device. For example, if the viewer looks aside from the display device, it becomes likely that the eyewear device fails to receive signals from the display device. The eyewear device may also malfunction under influence from noise signals.

In order to overcome the unreliable communication between the display device and the eyewear device, various eyewear devices, which operate in a flywheel mode on the basis of control data extracted from appropriately received signals, have been proposed. Even without signals appropriately received from the display device (non-reception period), these eyewear devices operate on the basis of the control data obtained before the non-receiving period. Therefore, a viewer may appropriately continue watching displayed images on the display device.

The operation of the liquid crystal shutters on the basis of the control data obtained in advance is also helpful to prevent noise signals from causing a malfunction in the eyewear device. For example, if a switching timing of the liquid crystal shutters is considerably different between control data obtained in advance and newly obtained control data, the eyewear device may determine that the new control data are generated from noise signals.

A change in image display operation (display mode) of the display device may require a change in the synchronization operation of the liquid crystal shutters. For example, if a video frame rate is changed, the synchronization operation of the liquid crystal shutters has to become a coincident operation frequency with the frame rate after the change. Or if a viewer changes a channel of the display device (e.g. a TV device), a phase of the cyclic display operation of the display device may change. In this case, the liquid crystal shutters have to perform the opening and closing operation under the new phase.

As described above, in many cases, the eyewear device uses the control data obtained in advance to open and close the liquid crystal shutters. However, it is difficult to instantaneously switch the video frame rate in the display device. Therefore, the video synchronization signal of the display device is disrupted while the frame rate is shifted to a new one (e.g. several seconds at the longest). Therefore, if the control data of the liquid crystal shutters are directly output in response to the video synchronization signal, the opening and closing operation of the liquid crystal shutters is disrupted as well. As described above, the operation of the liquid crystal shutters is influenced by the control data obtained in advance. Therefore, it is difficult to immediately switch the frame rate to the new frame rate. For example, if a display mode, in which left and right frame images are displayed at 60 Hz, respectively, is switched to another display mode, in which left and right frame images are displayed at 48 Hz, respectively, the opening and closing operation of the liquid crystal shutters is not instantaneously switched to the 48 Hz display mode. During the transition, the liquid crystal shutters irregularly open and close.

If there is a change in an image adjustment mode (e.g. image quality mode of TV) of the display device, it may be necessary not only to adjust the image quality in response to images, but also to change the opening and closing timings of the liquid crystal shutters. In this case, it is also difficult to instantaneously change the control data from the display device. Therefore, the opening and closing operation of the liquid crystal shutters is disrupted during the transition to the new control data.

In some cases, a flywheel mode is provided to allow a continuous operation of the eyewear device for a while at a timing determined by the previously detected control data, even if the control data from the display device is momentarily interrupted by impediments. However, the flywheel of the eyewear device may cause a flicker because of an unsynchronized opening and closing operation of the liquid crystal shutters at the previously determined timing with images although the timing of the shutters should have been changed in coincidence with the change in the display mode.

Due to the aforementioned reasons, unsynchronized or irregular opening and closing operation of the eyewear device may make a viewer perceive a flicker under the disturbed opening and closing operation of the liquid crystal shutters or the interfered synchronization of the liquid crystal shutter with images. This may irritate the viewer.

The flicker may occur under the following switching operation of the display mode. For example, if the display device is designed not only to display stereoscopic images (stereoscopic display mode), but also to alternately display two different programs (first program and second program: dual display mode), a few viewers may selectively view the first and second programs. If one of the viewers watches the first program, the liquid crystal shutters of the eyewear device worn by the viewer open while the first program is displayed, and close while the second program is displayed. The liquid crystal shutters of the eyewear device worn by another viewer may close during the display of the first program and open while the second program is displayed. A switching operation of the display mode of the display device from the stereoscopic display mode to the dual display mode requires a significantly different operation from the synchronized operation during the stereoscopic display mode for the liquid crystal shutters of the eyewear device. However, the eyewear device affected by the control data obtained in advance may not immediately execute the operation for the dual display mode. As a result, the viewers may perceive an unpleasant flicker.

Patent Document 1: JP 11-98538 A
Patent Document 2: JP 2000-36969 A

SUMMARY

It is an object of the present invention to provide techniques to prevent a switching operation between display modes from causing a flicker.

In one general aspect, the instant application describes a display device for switching a display mode between a first display mode for displaying an image, which is stereoscopically perceived by means of an eyewear device that performs an adjustment operation to adjust an incident light amount to the left eye and the right eye, and a second display mode, which is different from the first display mode. The display device includes: a signal generator which generates a timing signal for notifying a timing of a period to increase the incident light amount to the left and right eyes in the first and second display modes or a stop signal for stopping the adjustment operation, as a control signal to perform the adjustment operation; and a transmitter which transmits the control signal to the eyewear device. While the image is displayed in the first display mode, the transmitter transmits the timing signal for the first display mode. When the display mode is switched from the first display mode to the second display mode, the transmitter transmits the stop signal and then the timing signal for the second display mode to the eyewear device.

In another general aspect, the instant application describes an eyewear device. The eyewear device includes: a light amount adjuster configured to perform an adjustment operation for adjusting an incident light amount, which is an image light amount that enters a left eye and a right eye from a display device; a receiver which receives a control signal for controlling the adjustment operation; and a controller which controls the light amount adjuster in response to the control signal. The control signal includes a timing signal for notifying a timing of a period to increase the incident light amount to the left and right eyes or a stop signal for stopping the adjustment operation. The controller controls the adjustment operation of the light amount adjuster in response to the timing signal if the receiver receives the timing signal. The controller stops the adjustment operation if the receiver receives the stop signal. The receiver receives the timing signal for a first display mode while the image is displayed in the first display mode by the display device, and then if the display device switches an image display mode to a second display mode which is different from the first display mode, the receiver receives the stop signal, and then the timing signal for the second display mode.

In another general aspect, the instant application describes a video system. The video system includes: an eyewear device which performs an adjustment operation to adjust an incident light amount to a left eye and a right eye; and a display device which switches a display mode between a first display mode for displaying an image that is stereoscopically perceived and a second display mode that is different from the first display mode. The display device includes: a signal generator which generates a timing signal for notifying a timing of a period to increase the incident light amount to the left and right eyes in the first and second display modes or a stop signal for stopping the adjustment operation, as a control signal to perform the adjustment operation; and a transmitter which transmits the control signal to the eyewear device. While the image is displayed in the first display mode, the transmitter transmits the timing signal for the first display mode. When the display mode is switched from the first display mode to the second display mode, the transmitter transmits the stop signal, and then the timing signal for the second display mode to the eyewear device. The eyewear device includes: a light amount adjuster for performing the adjustment operation to adjust the incident light amount, which is an image light amount that enters the left and right eyes from the display device; a receiver which receives the control signal for controlling the adjustment operation; and a controller which controls the light amount adjuster in response to the control signal. The controller controls the adjustment operation of the light amount adjuster in response to the timing signal if the receiver receives the timing signal. The controller stops the adjustment operation if the receiver receives the stop signal. The receiver receives the timing signal for the first display mode while the image is displayed in the first display mode by the display device, and then if the display device switches an image display mode to the second display mode which is different from the first display mode, the receiver receives the stop signal, and then the timing signal for the second display mode.

The display device, the eyewear device and the video system according to the present invention may prevent a switching operation between display modes from causing a temporary irregular shuttering operation of the eyewear device which induces a flicker.

The objects, features and advantages of the present invention will be more apparent based on the ensuing detailed description and appended drawings.

BRIEF DESCRIPTION OF THE DRAWINGS

FIG. 7A is a schematic view of a command signal.
FIG. 7B is a schematic view of a command signal.
FIG. 7C is a schematic view of a command signal.
FIG. 7D is a schematic view of a command signal.
FIG. 7E is a schematic view of a command signal.
FIG. 7F is a schematic view of a command signal.

FIG. 11A is a schematic view of images observed by a viewer who selects the first video.

FIG. 11B is a schematic view of images observed by a viewer who selects the second video.

FIG. 12 is a schematic timing chart showing an operation of the eyewear device by the viewer who selects the first video.

FIG. 15 is a schematic timing chart showing a change in a transmission pattern of the command signal due to a switching operation of the display mode from the stereoscopic display mode to the dual display mode.

DETAILED DESCRIPTION

Figure 1:
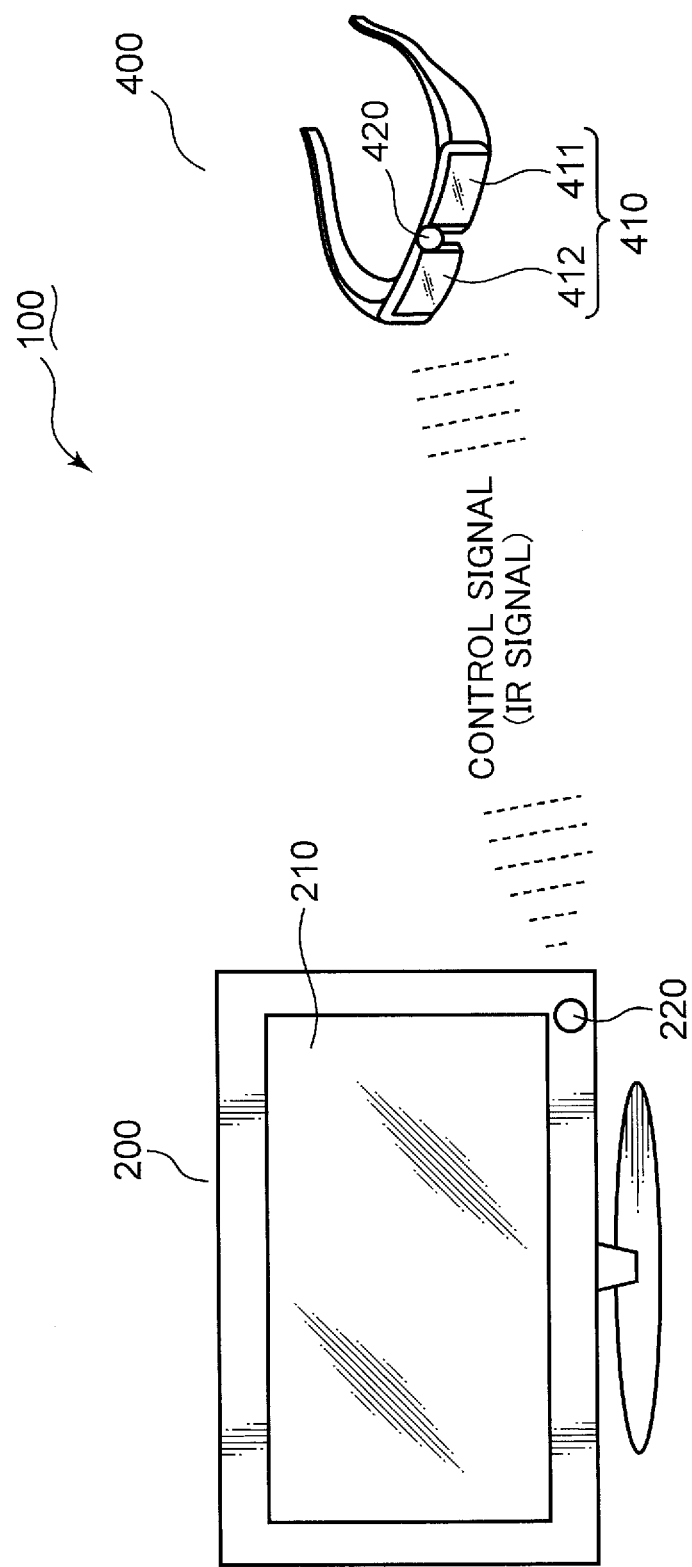
FIG. 1 is a schematic view showing a video system of the present embodiment.

A display device, an eyewear device and a video system according to one embodiment are described with reference to the drawings. It should be noted that the same reference numerals are given to the same constituent elements in various implementations described below. In order to clarify the description, redundant explanations are omitted as appropriate. Configurations, positional relationships or shapes shown in the drawings and the descriptions related to the drawings are provided to make principles of the various implementations easily understood. Accordingly, the principles of the various implementations are not in any way limited by the drawings and the detailed description with reference to the drawings.

<Configuration of Video System>

FIG. 1 is a schematic view of the video system 100 of the present implementation. The video system 100 is described with reference to FIG. 1.

The video system 100 includes a display device 200, which displays an image that is stereoscopically recognized, and an eyewear device 400, which performs an adjustment operation to adjust an incident light amount to the left eye and the right eye. A TV device, a personal computer and various other devices capable of displaying stereoscopic images may be exemplified as the display device 200.

The display device 200 includes a display panel 210 configured to display images. A left frame image, which is observed with the left eye, and a right frame image, which is observed with the right, are alternately displayed on the display panel 210. The left and right frame images represent different contents by an amount of parallax from each other. If the left frame image is observed with only the left eye and if the right frame image is observed with only the right eye, the viewer stereoscopically perceives the displayed images on the display panel 210 due to the parallax between the left and right frame images. In the following description, the display scheme to alternately display the left and right frame images is called "stereoscopic display mode". In the present implementation, the stereoscopic display mode is exemplified as the first display mode. A cyclic operation of the display device 200, which alternately displays the left and right frame images, is exemplified as the first display operation. The display panel 210 is exemplified as the display portion.

The eyewear device 400 looks like eyeglasses for vision correction. The eyewear device 400 includes a shutter portion 410 which performs an adjustment operation to adjust an incident light amount to the left and right eyes and make the image stereoscopically perceived. The shutter portion 410 includes a left shutter 411, which is situated in front of the left eye of the viewer, and a right shutter 412, which is situated in front of the right eye of the viewer, when the eyewear device 400 is worn.

If the left shutter 411 is closed, little light of a displayed image on the display panel 210 passes through the left shutter 411. Therefore, the incident light amount to the left eye decreases while the left shutter 411 is closed.

If the left shutter 411 is opened, the light of a displayed image on the display panel 210 passes through the left shutter 411. Therefore, the incident light amount to the left eye increases while the left shutter 411 is opened.

If the right shutter 412 is closed, little light of a displayed image on the display panel 210 passes through the right shutter 412. Therefore, the incident light amount to the right eye decreases while the right shutter 412 is closed.

If the right shutter 412 is opened, the light of a displayed image on the display panel 210 passes through the right shutter 412. Therefore, the incident light amount to the right eye increases while the right shutter 412 is opened.

The phrase "incident light amount" used in the description of the present implementation refers to a light amount of the displayed image on the display panel 210 which enters the left and/or right eyes. The shutter portion 410 opens and closes the left and right shutters 411, 412 to adjust the incident light amount to the left and right eyes, as described above. In the present implementation, the shutter portion 410 is exemplified as the light amount adjuster. A liquid crystal shutter element may be used for the left and right shutters 411, 412. Alternatively, another optical element capable of adjusting a deflection direction of the image light to adjust the incident light amount may be used for the light amount adjuster.

While a left frame image is displayed on the display panel 210, the left shutter 411 is opened whereas the right shutter 412 is closed. While a right frame image is displayed on the display panel 210, the left shutter 411 is closed whereas the right shutter 412 is opened. As a result, the left frame image is observed only with the left eye whereas the right frame image is observed only with the right eye. The viewer may stereoscopically perceive the displayed images on the display panel 210 due to the parallax between the left and right frame images.

The aforementioned opening and closing operation of the shutter portion 410 in synchronization with the frame image display is achieved in response to a control signal transmitted from the display device 200 to the eyewear device 400 under a predetermined protocol between the display device 200 and the eyewear device 400. The control signal is not used only for controlling the aforementioned light amount adjustment operation by means of the shutter portion 410, but also for the shutter portion 410 to execute other operations. The operations of the shutter portion 410 in response to the control signal are described later.

In the present implementation, the control signals are transmitted as IR (infrared) signals. Alternatively, the control signals may be RF (Radio Frequency) signals.

The display device 200 further includes a transmission device 220 configured to transmit the aforementioned control signals to the eyewear device 400. The eyewear device 400 further includes a reception device 420 configured to receive the control signals. In the present implementation, a light emitter configured to emit infrared rays is used as the transmission device 220. An optical receiver configured to receive the infrared rays is used as the reception device 420. In the present implementation, the transmission device 220 is exemplified as the transmitter. The reception device 420 is exemplified as the receiver.

Figure 2:
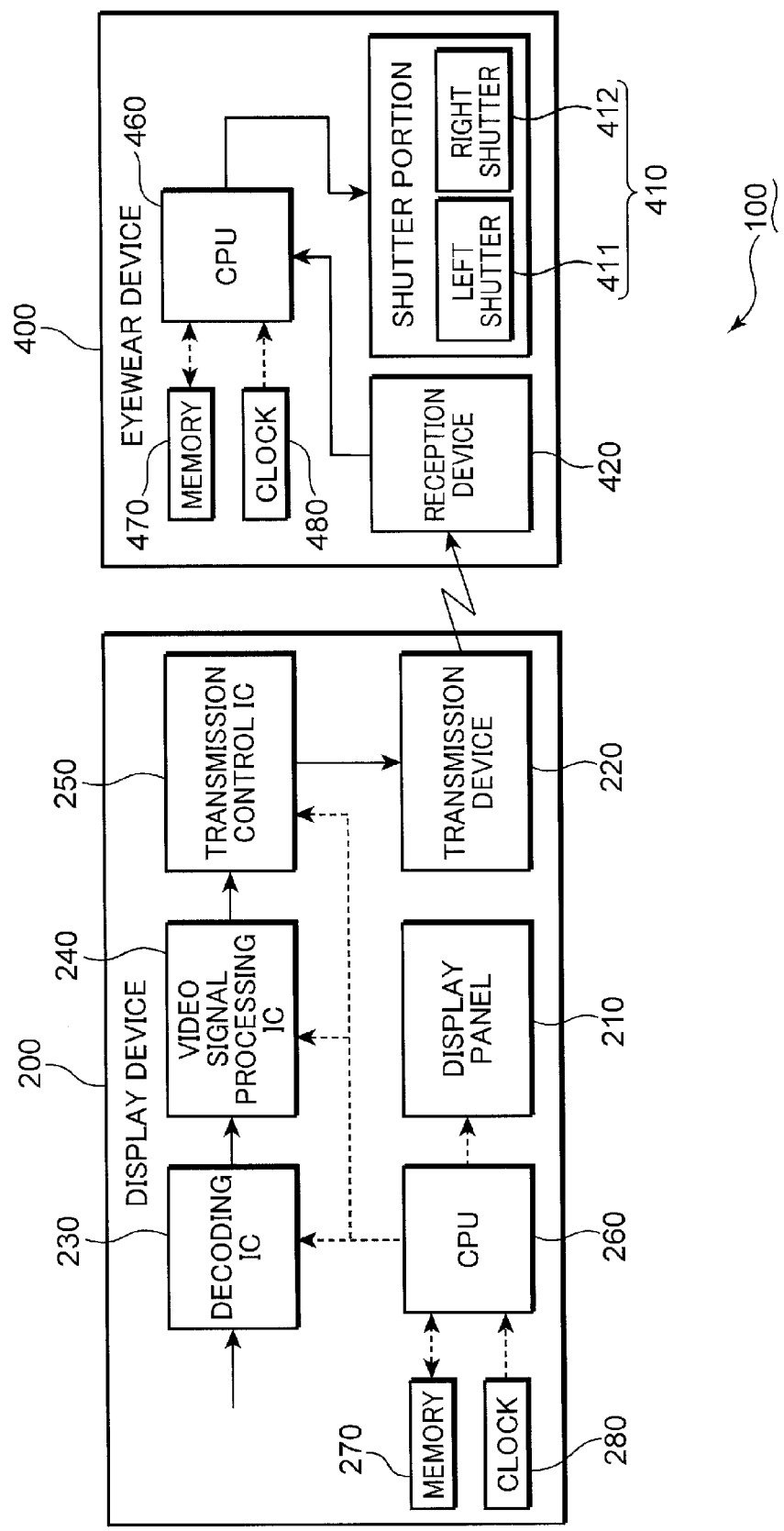
FIG. 2 is a schematic block diagram showing a hardware configuration of a display device and an eyewear device.

FIG. 2 shows a hardware configuration of the display device 200 and the eyewear device 400. The hardware configuration of the display device 200 and the eyewear device 400 is described with reference to FIGS. 1 and 2.

The display device 200 includes: a decoding IC 230, a video signal processing IC 240, a transmission control IC 250, a CPU 260, a memory 270, and a clock 280, in addition to the aforementioned display panel 210 and the transmission device 220.

Encoded video signals are input to the decoding IC 230. The decoding IC 230 decodes the video signals to output the image data in a predetermined format. Various formats such as MPEG (Motion Picture Experts Group)-2, MPEG 4 and H264 are exemplified as the encoding scheme of the video signals.

The video signal processing IC 240 performs signal processes about stereoscopic image display to generate and output suitable output signals to a signal input format of the display panel 210. The video signal processing IC 240 extracts data corresponding to the left and right frame images from the image data output from the decoding IC 230. Then, the display panel 210 alternately displays the left and right frame images in response to the data corresponding to the left and right frame images.

The video signal processing IC 240 may perform other processes about the image data output from the decoding IC 230. For example, a viewer may watch high quality images if the video signal processing IC 240 appropriately adjusts hues of the displayed image on the display panel 210. A video frame rate may be increased if the video signal processing IC 240 interpolates images between frames of the image data generated by the decoding IC 230.

While the display device 200 operates in the stereoscopic display mode, the video signal processing IC 240 performs the aforementioned signal processes about the stereoscopic image display. The video signal processing IC 240 executes processes for switching the display mode in response to the video signals input to the decoding IC 230.

For example, if video signals defining an operation frequency "48 Hz" are input to the decoding IC 230 after video signals defining an operation frequency "60 Hz", the video signal processing IC 240 executes processes to switch the operation frequency from "60 Hz" to "48 Hz". The phrase "operation frequency" refers to a display frequency of a set of left and right frame images. For example, "operation frequency 60 Hz" refers to the display of the left and right frame images at 60 Hz frequency, respectively.

If video signals representing two different contents (a first video and a second video) are input to the decoding IC 230 after video signals for instructing an operation under the stereoscopic mode, the video signal processing IC 240 executes processes to alternately display frame images of the first and second videos on the display panel 210.

If the first video is a sport program and the second video is an animation program, one viewer (first viewer) may watch the sport program while another viewer (second viewer) enjoys watching the animation program. The eyewear device 400 worn by the first viewer increases the incident light amount to the left and/or right eyes while the first video is displayed, and decreases the incident light amount to the left and right eyes while the second video is displayed. The eyewear device 400 worn by the second viewer increases the incident light amount to the left and/or right eyes while the second video is displayed, and decreases the incident light amount to the left and right eyes while the first video is displayed. Therefore, a few viewers may simultaneously enjoy different videos in contents from each other with the single display device 200. In the following description, this display format is called "dual display mode".

The aforementioned change in the operation frequency (frame rate) and the change from the stereoscopic display mode to the dual display mode are exemplified as the switching operation of the display modes. The operation to display the frame images at a different operation frequency from the operation frequency to display the preceding frame images on the display panel 210 and the aforementioned dual display mode are exemplified as the second display mode. The second display mode also refers to a display operation of frame images in a different phase from the cyclic operation of the display device 200 which alternately displays the left and right frame images in the stereoscopic display mode. The operation to display the frame image in a different phase and/or at a different operation frequency is exemplified as the second display operation. For example, the first display mode may be switched to the second display mode when a viewer switches a channel of the display device 200.

The transmission control IC 250 generates the aforementioned control signals for controlling an operation of the shutter portion 410 of the eyewear device 400. In the present implementation, the control signal includes a timing signal for notifying a timing of a period to increase the incident light amount to the left and right eyes in the first and second display modes and a stop signal for stopping the adjustment operation to the incident light amount by means of the eyewear device 400.

The transmission control IC 250 generates the timing signals which are transmitted while the display panel 210 displays images in the stereoscopic display mode. The transmission control IC 250 also generates stop signals which are transmitted when the stereoscopic mode is switched to another display mode (second display mode). The transmission control IC 250 controls the aforementioned transmission device 220 to adjust transmission timings of the timing signals or the stop signals in response to the display mode of the displayed image on the display panel 210. In the present implementation, the transmission control IC 250 is exemplified as the signal generator.

The transmission device 220 transmits the control signals under the control of the transmission control IC 250.

While images are displayed on the display panel 210 in the stereoscopic display mode, the transmission device 220 transmits the timing signals to the eyewear device 400. The shutter portion 410 of the eyewear device 400 performs the aforementioned switching operation in response to the timing signals received by the reception device 420. As a result, while the left frame image is displayed on the display panel 210, the left shutter 411 opens whereas the right shutter 412 closes. While the right frame image is displayed on the display panel 210, the left shutter 411 closes whereas the right shutter 412 opens.

If the stereoscopic display mode is switched to another display mode (second display mode), the transmission device 220 transmits the stop signals to the eyewear device 400. The shutter portion 410 of the eyewear device 400 stops the adjustment operation to the incident light amount in response to the stop signals received by the reception device 420. In the present implementation, if the reception device 420 receives the stop signal, both the left and right shutters 411, 412 maintain an open orientation to keep a condition where the incident light amounts to the left and right eyes are simultaneously increased.

The CPU 260 controls various elements (e.g. the decoding IC 230 and the video signal processing IC 240) of the display device 200. The CPU 260 controls the entire display device 200 according to programs recorded in the memory 270 or externally input signals (e.g. signals from a remote controller (not shown)).

The memory 270 is used as a domain to store programs, which the CPU 260 executes, and temporary data which are generated during the execution of the programs. A volatile RAM (Random Access Memory) and a non-volatile ROM (Read Only Memory) are exemplified as the memory 270.

The clock 280 supplies clock signals which are used as operational references of the CPU 260 and the other ICs.

The display panel 210 displays images in response to the output signals from the video signal processing IC 240. A CRT device, an LCD (Liquid Crystal Display), a PDP (Plasma Display) and a device using organic electro-luminescence are exemplified as the display panel 210.

The eyewear device 400 includes a CPU 460, a memory 470, and a clock 480, in addition to the aforementioned shutter portion 410 and the reception device 420.

The CPU 460 controls the eyewear device 400 according to programs recorded in the memory 470 and the control signals transmitted from the transmission device 220 of the display device 200. In this implementation, the CPU 460 is exemplified as the controller.

As described above, the reception device 420 receives the timing signals while images are displayed on the display panel 210 in the stereoscopic display mode. The CPU 460 controls the adjustment operation to the incident light amount by the shutter portion 410 in response to the timing signals received by the reception device 420. As a result, while the left frame image is displayed on the display panel 210, the left shutter 411 opens whereas the right shutter 412 closes. While the right frame image is displayed on the display panel 210, the left shutter 411 closes whereas the right shutter 412 opens.

As described above, if the image display mode on the display panel 210 is changed from the stereoscopic display mode to another display mode (second display mode), the reception device 420 receives the stop signals from the transmission device 220. The CPU 460 stops the adjustment operation of the shutter portion 410, in response to the stop signals received by the reception device 420. As a result, the left and right shutters 411, 412 maintain the open orientation to keep a condition where the incident light amounts to the left and right eyes are simultaneously increased.

The memory 470 is used as a domain to store data of programs, which the CPU 460 executes, and temporary data which are generated when the programs are executed.

In response to the timing signals received by the reception device 420, the CPU 460 generates timing data about a time to open the left shutter 411 (hereafter "left open time"), a time to close the left shutter 411 (hereafter "left close time"), a time to open the right shutter 412 (hereafter "right open time"), and a time to close the right shutter 412 (hereafter "right close time"). The memory 470 stores the timing data generated by the CPU 460. In the present implementation, the CPU 460 is exemplified as the data generator.

The CPU 460 compares the timing data stored in the memory 470 with newly obtained timing data to determine whether timing signals corresponding to the newly obtained timing data are noise signals. For example, if the newly obtained timing data is significantly different from the timing data stored in the memory 470, the CPU 460 determines that the newly obtained timing signals are noise signals.

After the noise signals are removed, the CPU 460 uses the timing data stored in the memory 470 and the newly obtained timing data to execute predetermined computing processes and determine timings of the increase periods to increase the incident light amount to the left and right eyes. The CPU 460 may average the left open times defined by the timing data stored in the memory 470 and the newly obtained timing data, so as to determine the left open time. The CPU 460 may average the left close times defined by the timing data stored in the memory 470 and the newly obtained timing data, so as to determine the left close time. The CPU 460 may average the right open times defined by the timing data stored in the memory 470 and the newly obtained timing data, so as to determine the right open time. The CPU 460 may average the right close times defined by the timing data stored in the memory 470 and the newly obtained timing data, so as to determine the right close time. As a result of the computing processes, the adjustment operation by the shutter portion 410 may become very reliable. In the present implementation, the CPU 460 is exemplified as the determination portion.

As described above, the reception device 420 receives the timing signals or the stop signals. The CPU 460 controls the shutter portion 410 in response to the timing signals or the stop signals. If the reception device 420 receives the stop signal after the timing signal, and then receives the timing signal again, the CPU 460 ignores the timing data obtained from the timing signals received before receiving the stop signals, and controls the shutter portion 410 in response to the timing data obtained from the timing signals received again. In the following description, the timing signals which the reception device 420 receives before receiving the stop signal are called "previous timing signals". The timing signals which the reception device 420 receives after receiving the stop signal are referred to as "subsequent timing signals". The previous timing signal is exemplified as the timing signal for the first display mode. The subsequent timing signal is exemplified as the timing signal for the second display mode.

It is advantageous in terms of a reliable adjustment operation of the shutter portion 410 after the display mode is switched if the shutter portion 410 is controlled on the basis of timing data obtained from the subsequent timing signals after the stop signals are received with ignoring the timing data based on the previous timing signals. For example, if stereoscopic images are displayed on the display panel 210 at a 60 Hz operation frequency (first display mode), and then other stereoscopic images are displayed at a 48 Hz operation frequency (second display mode), the display timings of the left and right frame images after receiving the stop signals may be significantly different from the display timings of the left and right frame images before the stop signals are received.

If the CPU 460 executes the aforementioned averaging processes without ignoring the timing data from the previous timing signals, the determination about the timings of the increase periods by the CPU 460 is affected by the timing data from the previous timing signal. As a result, the adjustment operation by the shutter portion 410 may not synchronize with the stereoscopic image display at the 48 Hz operation frequency, so that a viewer may perceive a flicker.

If the CPU 460 ignores the timings on the basis of the previous timing signal, the determination about the timings of the increase periods by the CPU 460 is not affected by the timing data from the previous timing signal. Therefore, the adjustment operation by the shutter portion 410 may be more easily synchronized with the stereoscopic image display at the 48 Hz operation frequency.

A period while the reception device 420 receives neither the timing signals nor the stop signals is called "non-reception period" in the following description. If the memory 470 stores the timing data generated in response to the timing signal received before the non-reception period, the CPU 460 determines the timings of the increase periods to increase the incident light amount to the left and right eyes on the basis of the timing data stored in the memory 470. As a result, even if the communication between the display device 200 and the eyewear device 400 is interrupted, the shutter portion 410 may appropriately continue the adjustment operation to the incident light amount.

It is preferable that a threshold period is set in advance for the non-reception period. If the non-reception period exceeds the threshold period, the CPU 460 may make the shutter portion 410 stop the adjustment operation. Consequently, the left and right shutters 411, 412 are kept at the open orientation, in which the incident light amounts to the left and right eyes are simultaneously increased.

The clock 480 supplies clock signals which become operational references to the CPU 460 and other ICs constituting the eyewear device 400. The CPU 460 may generate the timing data by means of the clock signals.

The principle of the present implementation is not limited to the exemplary hardware configuration in FIG. 2. Instead of several ICs such as the decoding IC 230 and the video signal processing IC 240, an integrated IC having these functions may be used. Similar processes to the processes of the program executed by the CPU 260 may be carried out by means of a PLD (Programmable Logic Device).

Figure 3:
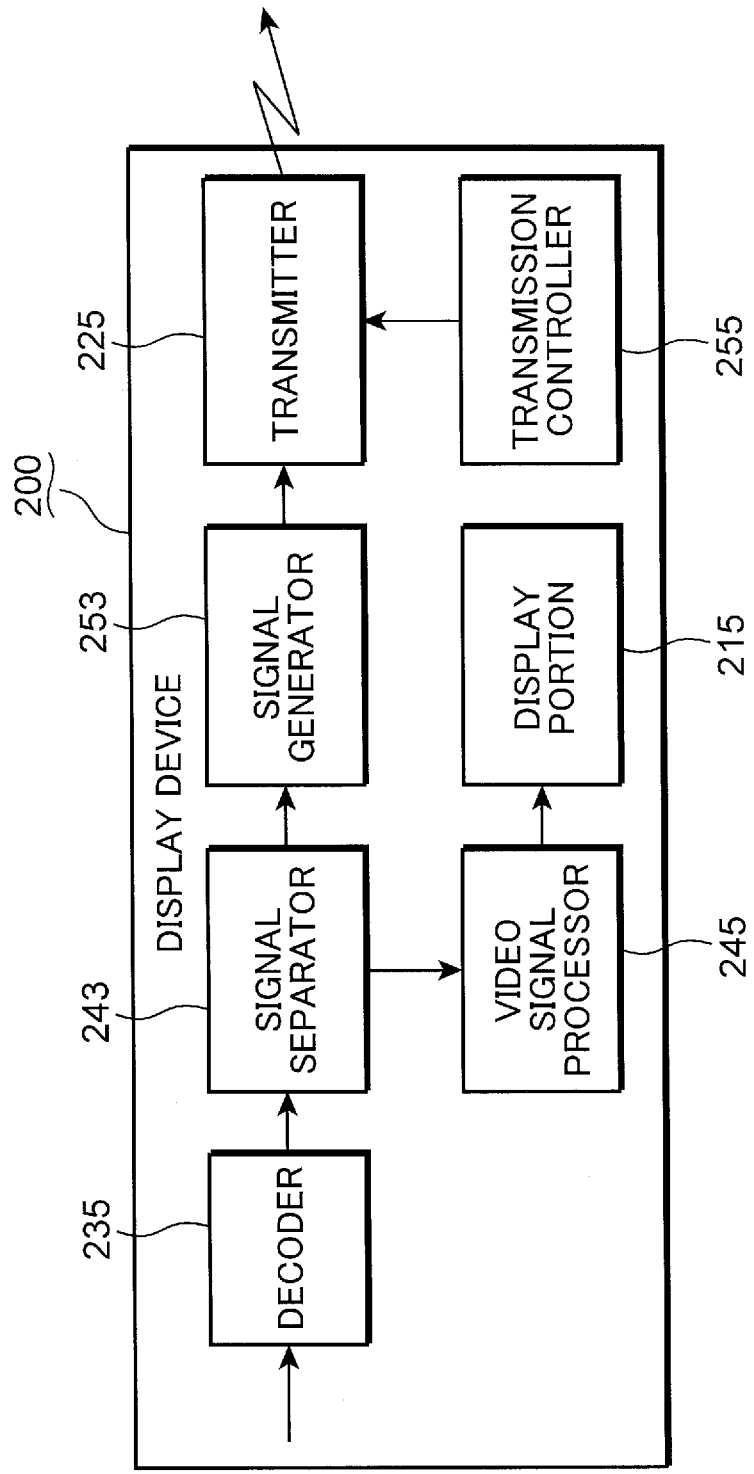
FIG. 3 is a schematic block diagram showing a functional configuration of the display device.

FIG. 3 is a schematic block diagram showing a functional configuration of the display device 200. The functional configuration of the display device 200 is described with reference to FIGS. 2 and 3.

The display device 200 has a decoder 235, a signal separator 243, a video signal processor 245, a display portion 215, a signal generator 253, a transmission controller 255, and a transmitter 225.

Encoded video signals are input to the decoder 235. The decoder 235 decodes the video signals to output the image data in a predetermined format. Various formats such as MPEG (Motion Picture Experts Group)-2, MPEG 4, and H264 may be used as the encoding scheme of the video signals. The decoder 235 corresponds to the decoding IC 230 described with reference to FIG. 2.

The signal separator 243 extracts and separates data corresponding to the left and right frame images from the image data output from the decoder 235.

According to characteristics of the display portion 215 for displaying the left and right frame images, the video signal processor 245 adjusts the data corresponding to the left and right frame images. For example, the video signal processor 245 may adjust a parallax between the left and right frame images according to a display surface size of the display portion 215. The image data processed by the video signal processor 245 are output to the display portion 215.

The signal separator 243 and the video signal processor 245 correspond to the video signal processing IC 240 described with reference to FIG. 2. Therefore, the signal separator 243 and the video signal processor 245 execute the switching operation of the display mode from the stereoscopic display mode to another display mode (second display mode), as described in the context of the video signal processing IC 240. The signal separator 243 notifies the signal generator 253 of the switching timing of the display mode.

The signal generator 253 generates timing signals, which are transmitted in synchronization with the display of the left and right frame images on the display portion 215, and stop signals, which are transmitted if the display mode is switched from the stereoscopic display mode to another mode (second display mode). In the present implementation, the timing signal includes several command signals for controlling the adjustment operation to the incident light amount by the eyewear device 400. A left open signal for opening the left shutter 411, a left close signal for closing the left shutter 411, a right open signal for opening the right shutter 412, and a right close signal for closing the right shutter 412 are exemplified as the timing signals of the command signal.

If the reception device 420 receives the left open signal, the left shutter 411 opens to increase the incident light amount to the left eye. If the reception device 420 receives the left close signal, the left shutter 411 closes to decrease the incident light amount to the left eye. In the present implementation, the left open signal is exemplified as the left increase signal. The left close signal is exemplified as the left decrease signal.

If the reception device 420 receives the right open signal, the right shutter 412 opens to increase the incident light amount to the right eye. If the reception device 420 receives the right close signal, the right shutter 412 closes to decrease the incident light amount to the right eye. In the present implementation, the right open signal is exemplified as the right increase signal. The right close signal is exemplified as the right decrease signal.

In the present implementation, the left open signal, the left close signal, the right open signal, and the right close signal, which are generated by the signal generator 253, are pulse signals. The signal generator 253 generates the command signals so that the left open signal, the left close signal, the right open signal and the right close signal have different waveforms from each other. As a result, the CPU 460 of the eyewear device 400 may extract information about the left open time, the left close time, the right open time and the right close time from the timing signals.

In the present implementation, the stop signal includes a common command signal, which has a common pulse waveform with one of the left open signal, the left close signal, the right open signal and the right close signal, and a notification command signal for notifying the eyewear device 400 that the received signal should be used to stop the adjustment operation. The command signals included in the timing signal and the stop signal are described later.

The transmission controller 255 controls the transmission timing of the control signal. As a result, the timing signals are transmitted to the eyewear device 400 while the display portion 215 displays images in the stereoscopic display mode. Once the display mode is switched from the stereoscopic display mode to another mode (second display mode), the stop signals are transmitted to the eyewear device 400.

In the present implementation, the signal generator 253 and the transmission controller 255 correspond to the transmission control IC 250 described with reference to FIG. 2. Therefore, a series of the control operations described in the context of the transmission control IC 250 may be applied to the signal generator 253 and the transmission controller 255.

The transmitter 225 transmits the control signal (timing signal and stop signal) generated by the signal generator 253 to the eyewear device 400 under the control of the transmission controller 255.

In the present implementation, the transmitter 225 transmits the left open signal and the left close signal while the display portion 215 displays the left frame image. As a result, a period to increase the incident light amount to the left eye is set while the left frame image is displayed. The transmitter 225 also transmits the right open signal and the right close signal while the display portion 215 displays the right frame image. As a result, a period to increase the incident light amount to the right eye is set while the right frame image is displayed.

To stop the adjustment operation of the shutter portion 410, the transmitter 225 transmits the notification command signal to the eyewear device 400 after transmitting the common command signal. As described above, the common command signal has a common pulse waveform with one of the left open signal, the left close signal, the right open signal and the right close signal. Therefore, the eyewear device 400 may not determine whether the signal received by the reception device 420 is the stop signal or the timing signal by the common command alone. The eyewear device 400 may determine that the signal received by the reception device 420 is the stop signal on the basis of the subsequently transmitted notification signal.

The transmitter 225 corresponds to the transmission device 220 described with reference to FIG. 2. Therefore, the transmission operation of the control signals described in the context of the transmission device 220 may be applied to the transmitter 225.

The display portion 215 displays the image data processed by the video signal processor 245 as images. The display portion 215 corresponds to the display panel 210 described with reference to FIG. 2. Therefore, a series of the display operations described in the context of the display panel 210 may be applied to the display portion 215.

Figure 4:
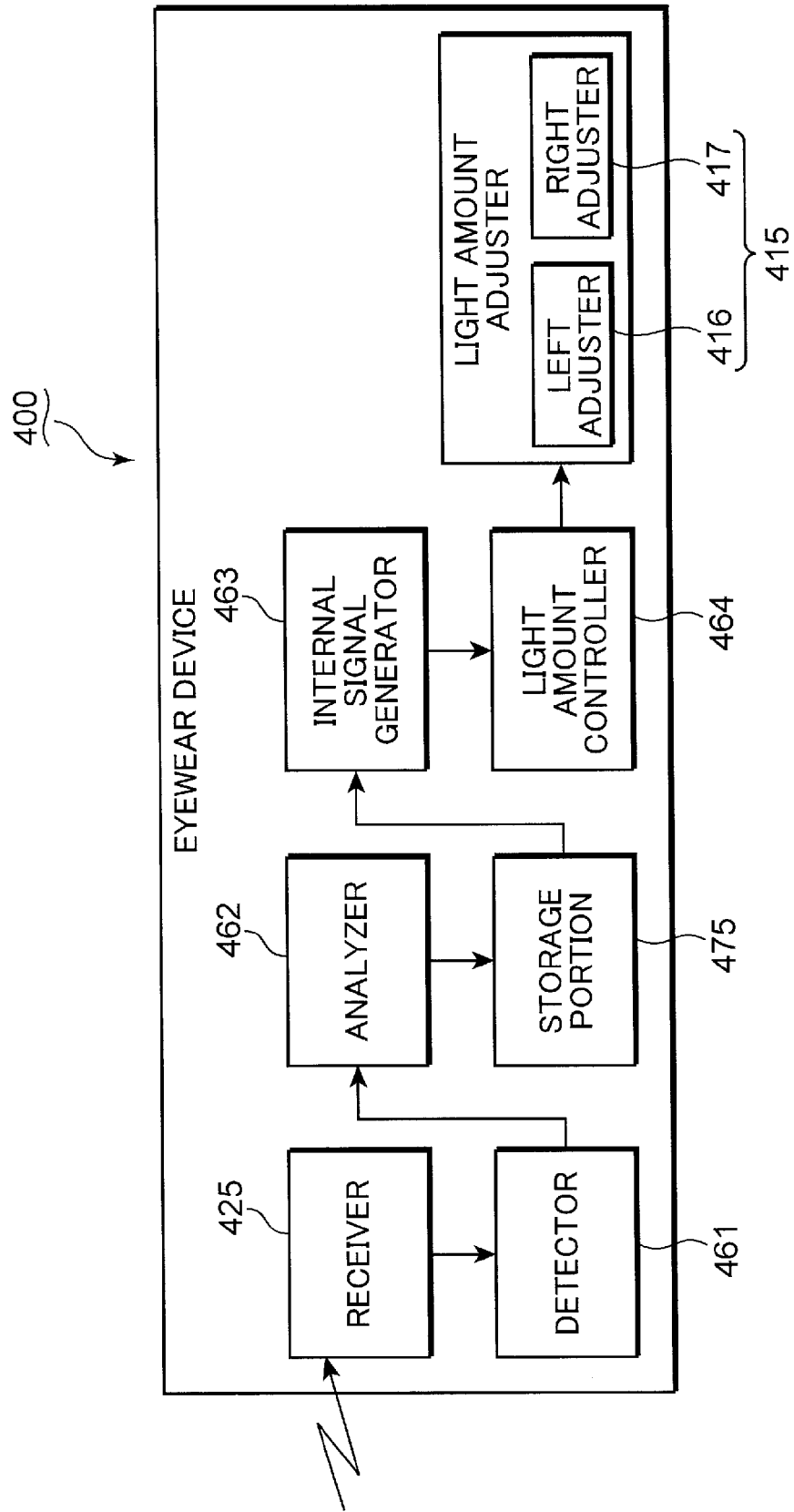
FIG. 4 is a schematic block diagram showing a functional configuration of the eyewear device.

FIG. 4 is a schematic block diagram showing a functional configuration of the eyewear device 400. The functional configuration of the eyewear device 400 is described with reference to FIGS. 2 to 4.

The eyewear device 400 has a receiver 425, a detector 461, an analyzer 462, a storage portion 475, an internal signal generator 463, a light amount controller 464, and a light amount adjuster 415.

The light amount adjuster 415 includes a left adjuster 416, which adjusts the incident light amount to the left eye, and a right adjuster 417, which adjusts the incident light amount to the right eye. The light amount adjuster 415 corresponds to the shutter portion 410 described with reference to FIG. 2. The left adjuster 416 corresponds to the left shutter 411 described with reference to FIG. 2. The right adjuster 417 corresponds to the right shutter 412 described with reference to FIG. 2. Therefore, the description about the operation of the shutter portion 410 and the left and right shutters 411, 412 may be applied to the light amount adjuster 415 and the left and right adjusters 416, 417.

The receiver 425 receives the control signals (timing signals or stop signals) transmitted from the transmitter 225 of the display device 200. As described above, the control signals in the present implementation are infrared signals. The receiver 425 outputs electric signals to the detector 461 in response to reception of the infrared rays. The receiver 425 corresponds to the reception device 420 described with reference to FIG. 2. Therefore, the description about the receive operation in the context of the reception device 420 may be applied to the receiver 425.

The detector 461 detects the control signals (electric signals) received by the receiver 425. In the present implementation, the timing signal or the stop signal transmitted as the control signal includes a few command signals in pulse signal form. The waveforms of these signals detected by the detector 461 are described later.

The analyzer 462 analyzes the control signal detected by the detector 461. As described above, the predetermined protocol is defined between the display device 200 and the eyewear device 400. The protocol predetermines a signal waveform to increase the incident light amount to the left eye, a signal waveform to decrease the incident light amount to the left eye, a signal waveform to increase the incident light amount to the right eye, a signal waveform to decrease the incident light amount to the right eye, signal waveforms, which are used as the aforementioned common command signal and notification command signal, and communication patterns of these signals.

For example, if the receiver 425 receives the left open signal, left close signal, right open signal or right close signal transmitted as the timing signal, the analyzer 462 compares the signal waveform determined by the protocol with the signal waveform of the signal received by the receiver 425 to confirm the reception of the left open signal, left close signal, right open signal and right close signal. The analyzer 462 then obtains information about the reception times of these signals and other information required for the adjustment operation of the light amount adjuster 415. The information obtained in this manner is exemplified as the timing data.

If the receiver 425 receives the notification command signal after receiving the common command signal transmitted as the stop signal, the analyzer 462 interprets that the display device 200 requests stopping the adjustment operation of the light amount adjuster 415, on the basis of the signal waveform and the transmission pattern defined by the protocol.

The analyzer 462 stores the information obtained as described above in the storage portion 475. In the present implementation, the analyzer 462 is exemplified as the data generator. The detector 461 and the analyzer 462 correspond to a part of the programs executed by the CPU 460, described with reference to FIG. 2. Therefore, the signal detection operation and the signal processing operation, which are described in the context of the CPU 460, may be applied to the detector 461 and the analyzer 462.

The storage portion 475 stores the control information, which the analyzer 462 analyzes and obtains. The control information is used to control operation of the light amount adjuster 415, as described above. The storage portion 475 corresponds to the memory 470 described with reference to FIG. 2. Therefore, the description about contents and usage of the information stored in the memory 470 may be applied to the storage portion 475.

The internal signal generator 463 generates internal signals, which are used to control the light amount adjuster 415, in response to the stored information in the storage portion 475, in order to determine a timing of the increase period to increase the incident light amount. In the present implementation, the internal signal generator 463 is exemplified as the determination portion. The internal signal generator 463 corresponds to the CPU 460 and the clock 480, which are described with reference to FIG. 2. Therefore, the control operation described in the context of the CPU 460 may be applied to the internal signal generator 463.

The light amount controller 464 controls the operation of the left and right adjusters 416, 417 in response to the internal signals. The light amount controller 464 corresponds to the control programs for the shutter portion 410 executed by the CPU 460 described with reference to FIG. 2. Therefore, the description about the control operation for the shutter portion 410 by the CPU 460 may be applied to the light amount controller 464. In the present implementation, the detector 461, the analyzer 462, the internal signal generator 463, and the light amount controller 464, which correspond to the CPU 460, are exemplified as the controller.

<Operation of Eyewear Device>

Figure 5:
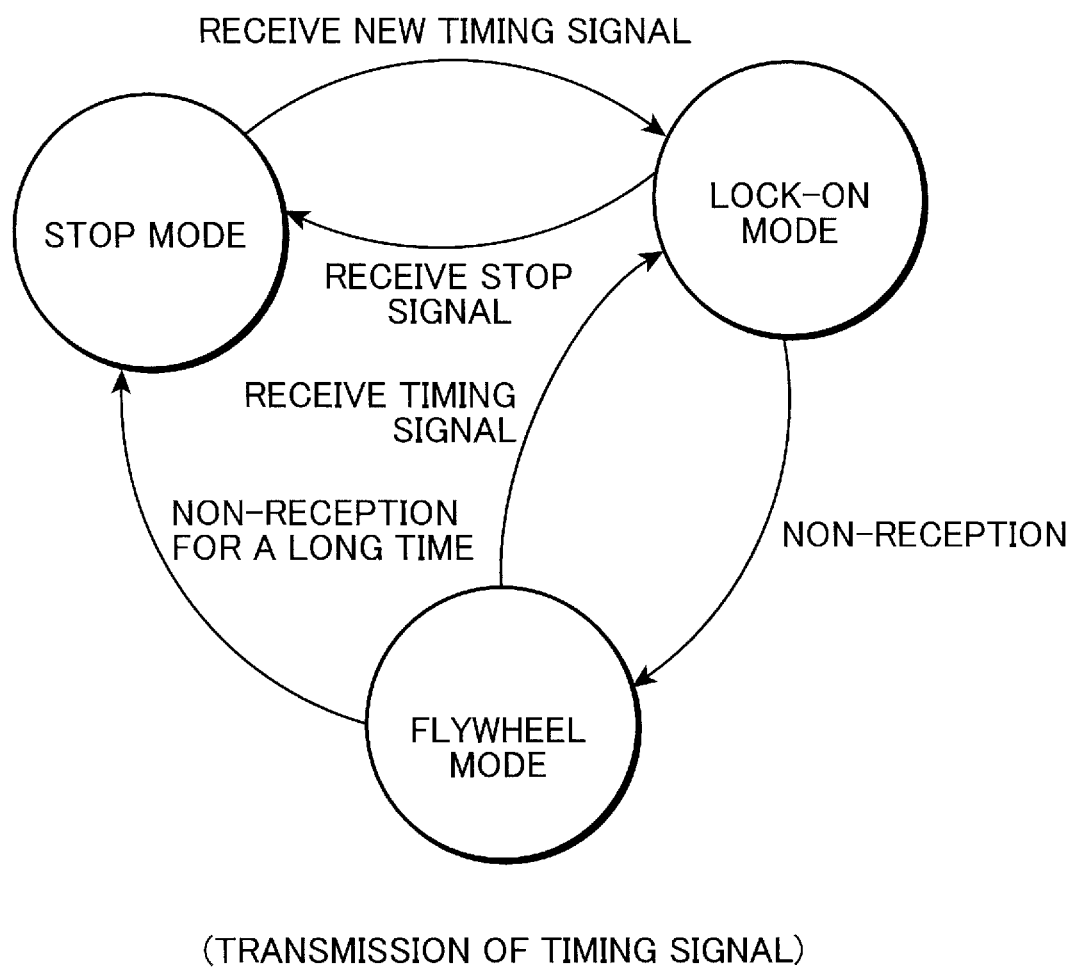
FIG. 5 is a schematic view showing a change in an operation mode of the eyewear device while the display device transmits a timing signal.

FIG. 5 is a schematic view showing a change in an operation mode of the eyewear device 4 while the display device 200 transmits timing signals. The operation of the eyewear device 400 while the display device 200 transmits the timing signals is described with reference to FIGS. 2 to 5.

The operation of the eyewear device 400 changes among a lock-on mode, a flywheel mode and a stop mode.

(Lock-On Mode)

If the receiver 425 appropriately receives the timing signals, the eyewear device 400 operates in the lock-on mode. In the lock-on mode, the operation of the shutter portion 410 locks on to the timing signals. The left shutter 411 opens at a time defined by the left open signal whereas the left shutter 411 closes at a time defined by the left close signal. The right shutter 412 opens at a time defined by the right open signal whereas the right shutter 412 closes at a time defined by the right close signal.

(Flywheel Mode)

An obstacle which passes between the viewer and the display device 200, noises and other factors may cause failures in a communication between the display device 200 and the eyewear device 400. Unless the receiver 425 appropriately receives the timing signals, which results in starting the non-reception period, the eyewear device 400 operates in the flywheel mode. In the flywheel mode, the shutter portion 410 operates on the basis of the timing signals appropriately received before the non-reception period starts.

While the receiver 425 appropriately receives the timing signal, information about the reception times of the left open signal, the left close signal, the right open signal, and the right close signal is sequentially stored in the storage portion 475. If the non-reception period starts, the internal signal generator 463 generates internal signals on the basis of the reception times stored in the storage portion 475. As a result, the shutter portion 410 may continue the opening and closing operation, even without appropriate reception of the timing signals.

(Stop Mode)

For reasons of viewer safety and/or control, the stop mode is set to stop the operation in a condition where the left and right shutters 411, 412 are opened. For example, if the flywheel mode continues for a long time, the synchronization may fails between the opening and closing operation of the shutter portion 410 and the frame image of the display portion 215. Or it may strain the viewer's eyes if stereoscopic images are watched for a long time. The stop mode is set in order to prevent such inconvenience. In the stop mode, the shutter portion 410 is opened, so that the viewer may safely perform a desired operation.

(Transit Between Lock-on Mode and Flywheel Mode)

While the receiver 425 appropriately receives the timing signals, the operation in the lock-on mode is executed. If the non-reception period starts without any reception of the timing signals or the stop signals, the operation of the eyewear device 400 changes from the lock-on mode to the flywheel mode. The internal signal generator 463 may use clock signals from the clock 480 to measure a time length of the non-reception period. If the receiver 425 appropriately receives the timing signals before the time length measured by the internal signal generator 463 exceeds the threshold period defined for the non-reception period in advance, the eyewear device 400 operates in the lock-on mode again.

(Transit Between Flywheel Mode and Stop Mode)

If the time length measured by the internal signal generator 463 exceeds the threshold period defined for the non-reception period in advance, for example, by several minutes, the internal signal generator 463 outputs internal signals to stop the opening and closing operation of the light amount adjuster 415 (shutter portion 410), toward the light amount controller 464. As a result, the operation of the eyewear device 400 changes from the flywheel mode to the stop mode. Since the eyewear device is in the non-reception condition for a long time, power is conserved by stopping the operation of the eyewear device.

(Transit Between Stop Mode and Lock-On Mode)

If the receiver 425 receives the timing signals during the stop mode, information about the left open time, left close time, right open time and right close time, which are determined in response to the timing signals, is sequentially stored in the storage portion 475. If the storage portion 475 stores sufficient information for the internal signal generator 463 to determine the increase periods to increase the incident light amounts to the left and right eyes, the operation of the eyewear device 400 shifts from the stop mode to the lock-on mode.

The change in the operation mode of the eyewear device 400 while the display device 200 transmits the stop signals is described with reference to FIGS. 2 to 5. The phrase "non-reception period" refers to a period in which the stop signals are not appropriately received as well as the timing signals. The flywheel mode in which the display device 200 transmits the stop signals is the same as the flywheel mode described with reference to FIG. 5.

If the receiver 425 of the eyewear device 400 operating in the lock-on mode receives the stop signals, the operation of the eyewear device 400 shifts from the lock-on mode to the stop mode. As described above, reception of the stop signals means the change in the display mode of the display portion 215. As a result of the change in the display mode, the display timing of the frame image changes. In the present implementation, the shutter portion 410 stops operating if the stop signal is received. Therefore, the viewer does not perceive a flicker, which is caused by asynchronous operation between the opening and closing operation of the shutter portion 410 and the display of the frame image.

In the present implementation, the transmitter 225 of the display device 200 repeatedly transmits the stop signals for a predetermined number of times. The transmitter 225 then transmits the timing signals to the eyewear device 400 in response to the displayed images in the new display mode (second display mode).

The receiver 425 of the eyewear device 400 receives the timing signals (subsequent timing signals) transmitted under the new display mode. Based on the subsequent timing signals, the analyzer 462 obtains information about the left open time, the left close time, the right open time, and the right close time, and records the information in the storage portion 475. The internal signal generator 463 ignores the control information recorded in the storage portion 475 before receiving the stop signal, and generates internal signals in response to the information about the left open time, the left close time, the right open time, and the right close time, which are obtained from the subsequent timing signals. For example, the internal signal generator 463 executes the averaging process for each of the left open time, the left close time, the right open time and the right close time, which are obtained from several timing signals, to generate the internal signals in response to the averaged left open time, left close time, right open time and right close time. The stop mode continues until timing signals are sufficiently received for the internal signal generator 463 to generate the internal signals. The operation of the eyewear device 400 shifts to the lock-on mode once the internal signal generator 463 generates the internal signals to operate the light amount adjuster 415 (shutter portion 410).

As described above, the operation frequency of the eyewear device 400 has a finite value in the lock-on mode. The eyewear device 400 continuously receives a command set for the stereoscopic or dual display mode, which is described later. As a result, the eyewear device 400 is stuck on the frame frequency defined in the command set to open and close the shutter 410. Therefore, the viewer may appropriately perceive displayed images under the stereoscopic or dual display mode. Unless the command set, which is described later, is appropriately received or if the operation frequency is changed, the eyewear device 400 enters the flywheel mode. As a result, the eyewear device 400 may continue the opening and closing operation of the shutter portion 410. However, once the eyewear device 400 receives the stop signal, the eyewear device 400 forcibly enters the stop mode. The shutter portion 410 maintains the open condition during the stop mode.

In the stop mode, the operation frequency of the eyewear device 400 has an infinite value, so that the shutter portion 410 stops. In order to ensure safety of the viewer, the shutter portion 410 maintains the open condition if the opening and closing operation stops. As a result, the viewer can see the ambience without interruption by the shutter portion 410. As long as the eyewear device 400 continues receiving the stop signals, the shutter portion 410 maintains the open condition. If the eyewear device 400 in the stop mode receives a command set for the stereoscopic or dual display mode, which is described later, the eyewear device 400 enters the lock-on mode a predetermined period after the reception time of the command set. As a result, the eyewear device 400 operates the shutter portion 410 at a predetermined operation frequency (finite value). If the eyewear device 400 receives the stop signals without signals for the stereoscopic or dual display mode for a while after the shutter portion 410 enters the open condition, the eyewear device 400 may keep the shutter portion 410 of the eyewear device 400 opened even unless the stop signals are received.

As described above, the flywheel mode is started unless the command set is appropriately received. The eyewear device 400 in the flywheel mode continues opening and closing the shutter portion 410 on the basis of the previously received command set. The operation frequency in the flywheel mode is maintained for at least several seconds. If the eyewear device 400 in the flywheel mode receives a command set again and maintains the operation frequency defined by the received command set, the eyewear device 400 operates in the lock-on mode. If the eyewear device 400 in the flywheel mode receives a command set again to newly set the operation frequency defined by the received command set, the eyewear device 400 operates in the lock-on mode. Unless a command set is received for a predetermined period after the start of the flywheel mode, the eyewear device 400 shifts from the flywheel mode to the stop mode.

<Command Signal>

Figure 6:
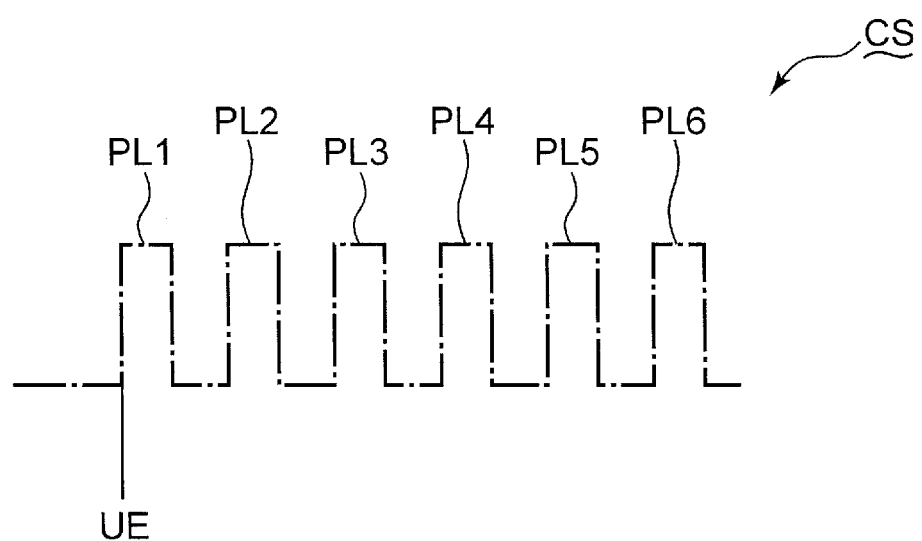
FIG. 6 is a schematic view showing a command signal defined by a communication protocol between the display device and the eyewear device.

FIG. 6 is a schematic view showing a command signal CS defined by the communication protocol between the display device 200 and the eyewear device 400. The command signal CS is described with reference to FIGS. 1, 4 and 6.

The command signal CS includes pulse signals which are transmitted at a predetermined frequency. FIG. 6 shows six pulse positions, PL1 to PL6, where the pulse signal turns ON. In the present implementation, the duty cycle between ON and OFF is 50%.

In the present implementation, the pulse signal is set to ON at the pulse position PL1. The rise edge UE of the pulse signal is processed as a reference position of the command signal reception time. The pulse signal at the pulse position PL6 is also set to ON. The eyewear device 400 refers to the ON signal at the pulse position PL6 to detect the end of the command signal CS.

Based on the ON/OFF settings at the pulse positions PL2 to PL5 between the pulse positions PL1, PL6, the analyzer 462 of the eyewear device 400 interprets control contents indicated by the command signal.

FIGS. 7A to 7F show various command signals CS. The command signals CS are further described with reference to FIGS. 6 to 7F.

In the present implementation, there are four pulse signals, which are set to ON in one command signal CS.

In the command signal CS shown in FIG. 7A, the pulse signals P1, P3, P4 and P6, which correspond to the pulse positions PL1, PL3, PL4 and PL6, are set to ON, respectively. "2Dh" in FIG. 7A refers to a hexadecimal number corresponding to the ON/OFF pattern of the pulse signals of the command signal CS in FIG. 7A.

In the command signal CS shown in FIG. 7B, the pulse signals P1, P2, P5 and P6, which correspond to the pulse positions PL1, PL2, PL5 and PL6, are set to ON, respectively. "33h" in FIG. 7B refers to a hexadecimal number corresponding to the ON/OFF pattern of the pulse signals of the command signal CS in FIG. 7B.

In the command signal CS shown in FIG. 7C, the pulse signals P1, P2, P4 and P6, which correspond to the pulse positions PL1, PL2, PL4 and PL6, are set to ON, respectively. "35h" in FIG. 7C refers to a hexadecimal number corresponding to the ON/OFF pattern of the pulse signals of the command signal CS in FIG. 7C.

In the command signal CS shown in FIG. 7D, the pulse signals P1, P3, P5 and P6, which correspond to the pulse positions PL1, PL3, PL5 and PL6, are set to ON, respectively. "2Bh" in FIG. 7D refers to a hexadecimal number corresponding to the ON/OFF pattern of the pulse signals of the command signal CS in FIG. 7D.

In the command signal CS shown in FIG. 7E, the pulse signals P1, P2, P3 and P6, which correspond to the pulse positions PL1, PL2, PL3 and PL6, are set to ON, respectively. "39h" in FIG. 7E refers to a hexadecimal number corresponding to the ON/OFF pattern of the pulse signals of the command signal CS in FIG. 7E.

In the command signal CS shown in FIG. 7F, the pulse signals P1, P4, P5 and P6, which correspond to the pulse positions PL1, PL4, PL5 and PL6, are set to ON, respectively. "27h" in FIG. 7F refers to a hexadecimal number corresponding to the ON/OFF pattern of the pulse signals of the command signal CS in FIG. 7F.

If the communication protocol between the display device 200 and the eyewear device 400 defines that only the ON/OFF patterns shown in FIGS. 7A to 7F are used for the communication, and if the receiver 425 receives a signal which does not have any of the patterns shown in FIGS. 7A to 7F, the analyzer 462 may process the signal received by the receiver 425 as a noise signal. If the receiver 425 receives a signal with any pattern shown in FIG. 7A to FIG. 7F, the analyzer 462 records the signal reception time by the receiver 425 and other information required for controlling the light amount adjuster 415 (shutter portion 410) in the storage portion 475.

As described above, the command signal is a pulse stream which includes four pulses that are set to ON. The pulse stream includes the first pulse (pulse position PL1) and the sixth pulse (pulse position PL6). The type of command signal is determined on the basis of the ON/OFF pattern between the first and sixth pulses.

<Operation of Eyewear Device>

Four command sets are provided to achieve the operation modes of the eyewear device 400. A command set includes two or four pulse commands. If a command set is received, the eyewear device 400 determines an operation mode. The aforementioned command having the pulse pattern "2Dh", which is transmitted at first among the command sets, is commonly used over the four command sets. The shutter portion 410 opens/closes on the basis of the reference time (aforementioned rise edge UE) of the signal having the pulse pattern "2Dh". The four command sets are shown below.

<Command Set A in Stereoscopic Display Mode>

The command set A includes command signals having the pulse patterns "2Dh", "33h", "35h" and "2Bh".

<Command Set B in Stereoscopic Display Mode>

The command set B includes command signals having the pulse patterns "2Dh", "2Bh", "35h" and "33h".

<Command Set in Dual Display Mode>

The command set in the dual display mode includes command signals having the pulse patterns "2Dh" and "27h".

<Command Set in Stop Mode>

The command set in the stop mode includes command signals having the pulse patterns "2Dh" and "39h".

The aforementioned group of the command sets includes a common command signal having the pulse pattern "2Dh". The common command signal having the pulse pattern "2Dh" is a signal which is transmitted at first. The operation of the eyewear device 400 in response to these command sets is described.

<Operation of Eyewear Device in Stereoscopic Display Mode>

Figure 8:
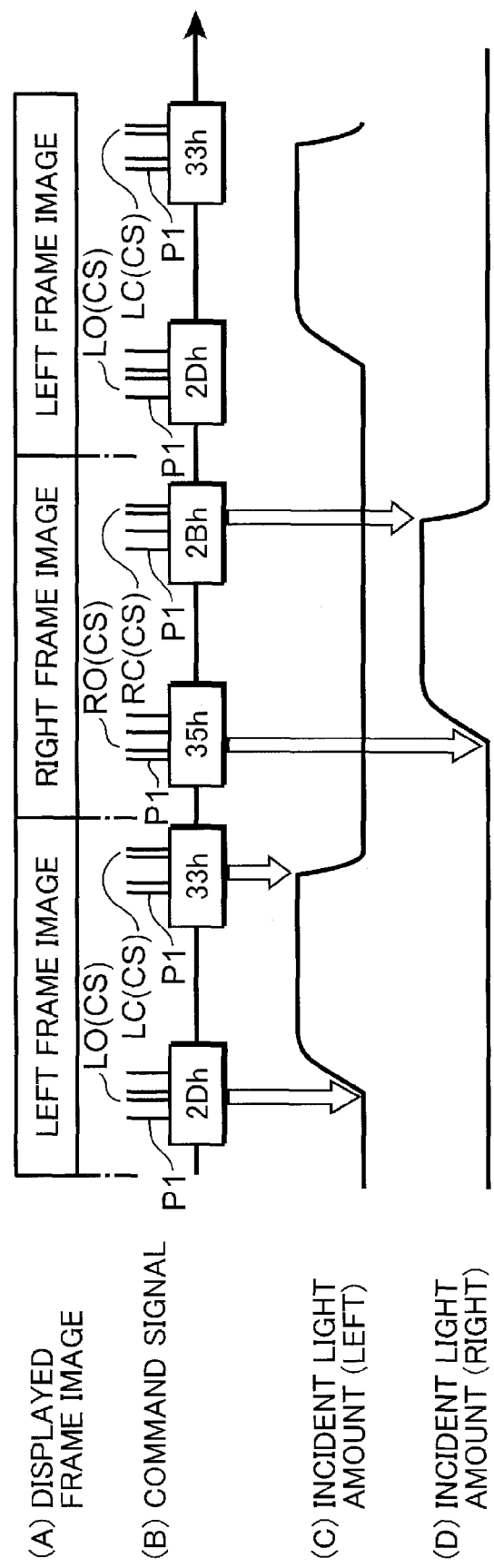
FIG. 8 is a schematic timing chart showing an operation of the eyewear device in a stereoscopic display mode.
Figure 9:
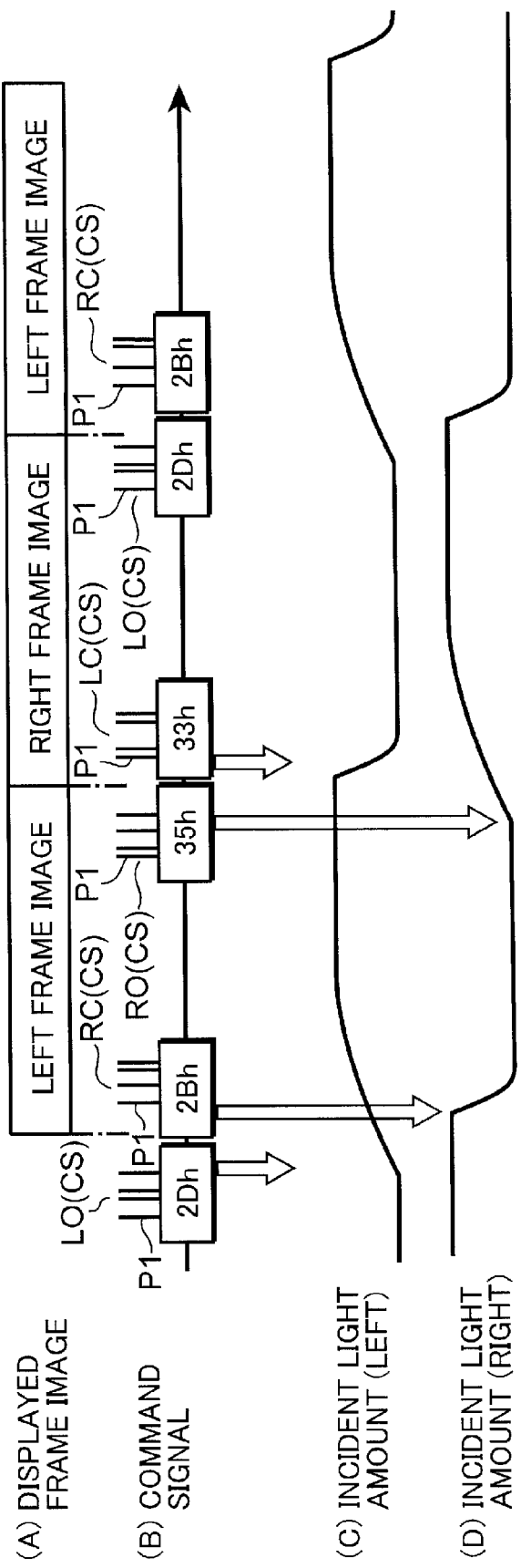
FIG. 9 is a schematic timing chart showing an operation of the eyewear device in the stereoscopic display mode.

FIGS. 8 and 9 show the operation of the eyewear device 400 in the stereoscopic display mode. The operation of the eyewear device 400 in the stereoscopic display mode is described with reference to FIGS. 2 to 4 and FIGS. 7A to 9.

The sections (a) in FIGS. 8 and 9 show a frame image displayed by the display portion 215 of the display device 200. The display device 215 alternately displays the left and right frame images.

The sections (b) in FIGS. 8 and 9 show the command signals which the receiver 425 of the eyewear device 400 receives. The sections (c) in FIGS. 8 and 9 show a change in the incident light amount to the left eye. The sections (d) in FIGS. 8 and 9 show a change in the incident light amount to the right eye.

In the present implementation, the command signal CS having the ON/OFF pattern of pulses (hereafter "pulse pattern") denoted with the hexadecimal "2Dh" is used as the left open signal LO for opening the left shutter 411. The command signal CS having the pulse pattern denoted with the hexadecimal "33h" is used as the left close signal LC for closing the left shutter 411. The command signal CS having the pulse pattern denoted with the hexadecimal "35h" is used as the right open signal RO for opening the right shutter 412. The command signal CS having the pulse pattern denoted with the hexadecimal "2Bh" is used as the right close signal RC for closing the right shutter 412.

As the sections (c) in FIGS. 8 and 9 show, the left shutter 411 opens when the left open signal LO is received. Therefore, the incident light amount to the left eye increases in response to the reception of the left open signal LO. The left shutter 411 closes when the left close signal LC is received. Therefore, the incident light amount to the left eye decreases in response to the reception of the left close signal LC.

As the sections (d) in FIGS. 8 and 9 show, the right shutter 412 opens when the right open signal RO is received. Therefore, the incident light amount to the right eye increases in response to the reception of the right open signal RO. The right shutter 412 closes when the right close signal RC is received. Therefore, the incident light amount to the right eye decreases in response to the reception of the right close signal RC.

The analyzer 462 of the eyewear device 400 analyzes not only the waveform of the command signal CS but also information on the basis of a reception order of the command signals CS. The analyzer 462 handles signals, which the receiver 425 receives in a period from the reception of the left open signal LO to the reception of the next open signal LO, as one signal group to determine the reception order of the command signals CS. For example, the reception order of the command signals CS shown in FIG. 8 is an order of the left open signal LO, the left close signal LC, the right open signal RO and the right close signal RC. The reception order of the command signals CS shown in FIG. 9 is an order of the left open signal LO, the right close signal RC, the right open signal RO and the left close signal LC.

Comparing the section (c) in FIG. 8 to the section (c) in FIG. 9, there is a difference in an increase rate of the incident light amount to the left eye. In response to the reception order of the command signals CS, the analyzer 462 generates and stores control data about a velocity of opening the left shutter 411 in the storage portion 475.

Comparing the section (d) in FIG. 8 to the section (d) in FIG. 9, there is a difference in an increase rate of the incident light amount to the right eye. In response to the reception order of the command signals CS, the analyzer 462 generates and stores control data about a velocity of opening the right shutter 412 in the storage portion 475.

As described above, if the receiver 425 sequentially and cyclically receives the command signals having the pulse patterns "2Dh", "33h", "35h", and "2Bh", or if the receiver 425 sequentially and cyclically receives the command signals having the pulse patterns "2Dh", "2Bh", "35h", and "33h", the eyewear device 400 determines that the display device 200 displays images in the stereoscopic display mode. If the order of the pulse patterns of the receive command signals is "2Dh", "33h", "35h" and "2Bh", the eyewear device 400 determines that the shutter portion 410 operates in the operation mode described with reference to FIG. 8. If the order of the pulse patterns of the received command signals is "2Dh", "2Bh", "35h" and "33h", the eyewear device 400 determines that the shutter portion 410 operates in the operation mode described with reference to FIG. 9.

The eyewear device 400 opens the left shutter 411 at a reception timing of the rise edge of the first pulse signal P1 having the pulse pattern "2Dh". The eyewear device 400 closes the left shutter 411 at a reception timing of the rise edge of the first pulse signal P1 having the pulse pattern "33h". The eyewear device 400 opens the right shutter 412 at a reception timing of the rise edge of the first pulse signal P1 having the pulse pattern "35h". The eyewear device 400 closes the right shutter 412 at a reception timing of the rise edge of the first pulse signal P1 having the pulse pattern "2Bh".

<Operation of Eyewear Device in Dual Display Mode>

Figure 10:
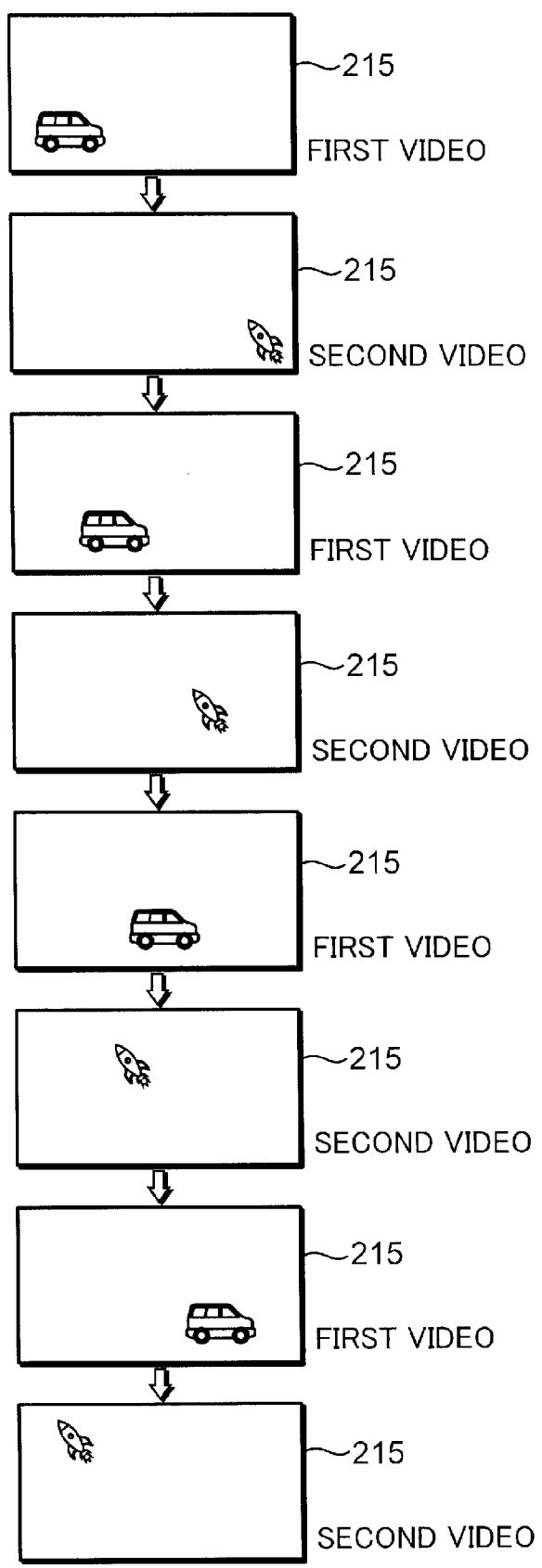
FIG. 10 is schematic views of images displayed on a display portion of the display device in the dual display mode.

FIG. 10 is a schematic view of displayed images on the display portion 215 of the display device 200 in the dual display mode. The dual display mode is described with reference to FIGS. 3 and 10.

If the viewer selects the dual display mode, the display portion 215 sequentially displays frame images of different videos in contents. The display portion 215 in FIG. 10 displays a video of a car (hereafter "first video"), and a video of a rocket (hereafter "second video"). The display portion 215 alternately displays frame images of the first and second videos.

FIG. 11A shows the images observed by the viewer who selects the first video. FIG. 11B shows the images observed by the viewer who selects the second video. The dual display mode is described with reference to FIGS. 3, 4, 10 to 11B.

If the viewer selects the first video, the viewer selectively observes only frame images of the first video (hereafter "first frame images"). Therefore, the viewer may enjoy a movie of the car. If the viewer selects the second video, the viewer selectively observes only frame images of the second video (hereafter "second frame images"). Therefore, the viewer can enjoy a movie of the rocket.

Figure 13:
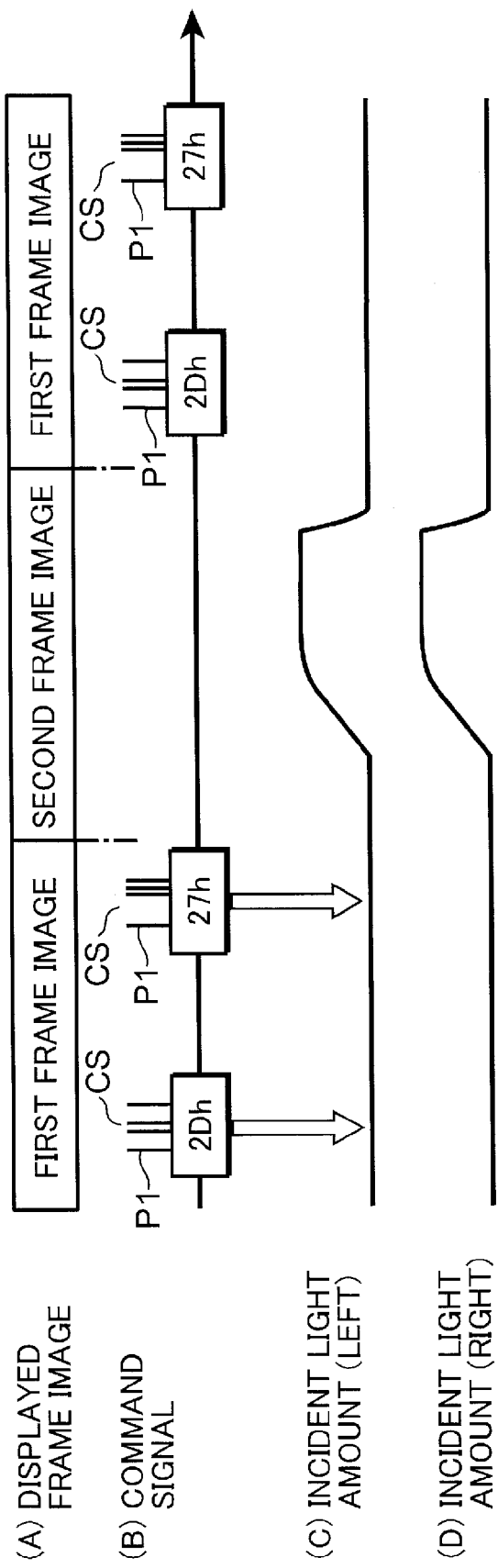
FIG. 13 is a schematic timing chart showing an operation of the eyewear device by the viewer who selects the second video.

FIG. 12 is a schematic timing chart showing operation of the eyewear device 400 for the viewer who selects the first video. FIG. 13 is a schematic timing chart showing operation of the eyewear device 400 for the viewer who selects the second video. The operation of the eyewear device 400 in the dual display mode is described with reference to FIGS. 3, 4, 8, 9, 12 and 13.

The selections (a) of FIGS. 12 and 13 show frame images which the display portion 215 of the display device 200 displays in the dual display mode. The display portion 215 alternately displays the first and second frame images.

The sections (b) in FIGS. 12 and 13 show command signals which the receiver 425 of the eyewear device 400 receives. The sections (c) in FIGS. 12 and 13 show a change in the incident light amount to the left eye. The sections (d) in FIGS. 12 and 13 show a change in the incident light amount to the right eye.

In the dual display mode, the transmitter 225 of the display device 200 transmits the command signal CS having the pulse pattern denoted with the hexadecimal "2Dh" and the command signal CS having the pulse pattern denoted with the hexadecimal "27h". If a pulse pattern of a signal received by the receiver 425 of the eyewear device 400 is a combination of "2Dh" and "27h", the analyzer 462 determines that the display mode of the display device 200 is the dual display mode. The command signal CS having the pulse pattern "27h" is not used in the stereoscopic display mode described with reference to FIGS. 8 and 9. On the other hand, the command signal CS having the pulse pattern "2Dh" is used as the left open signal LO in the stereoscopic display mode described with reference to FIGS. 8 and 9.

As shown in FIG. 12, if the signal having the pulse pattern "27h" is received subsequent to the signal having the pulse pattern "2Dh", the analyzer 462 of the eyewear device 400 of the viewer who selects the first video interprets a corresponding time to the reception time of the signal having the pulse pattern "2Dh" as a time at which both the left and right shutters 411, 412 are opened. The analyzer 462 also interprets a corresponding time to the reception time of the signal having the pulse pattern "27h" as a time at which both the left and right shutters 411, 412 are closed.

On the other hand, as shown in FIG. 13, if the signal having the pulse pattern "27h" is received subsequent to the signal having the pulse pattern "2Dh", the analyzer 462 of the eyewear device 400 for the viewer who selects the second video interprets that a time, at which both the left and right shutters 411, 412 are opened, delays by a half of the reception cycle of the signal having the pattern "2Dh" from the corresponding time to the reception time of the signal having the pulse pattern "2Dh". The analyzer 462 also interprets that a time, at which both the left and right shutters 411, 412 are closed, delays by a half of the reception cycle of the signal having the pattern "27h" from the corresponding time to the reception time of the signal having the pulse pattern "27h".

As described above, a command set in the dual display mode is used for viewing the first and second videos. The eyewear device 400 has a function to switch the operation modes for the first and second videos. The viewer may operate the eyewear device 400 to select the first or second video.

As described above, the command set in the dual display mode includes the command signals having the pulse patterns "2Dh" and "27h". The command signals having the pulse signals "2Dh" and "27h" are transmitted while the first frame image is displayed whereas the command signal having the pulse signals "2Dh" and "27h" are not transmitted while the second frame image is displayed. If the viewer operates the eyewear device 400 to select the first video, the left and right shutters 411, 412 simultaneously open/close in synchronization with the display of the first video. The timing, at which the left and right shutters 411, 412 are opened, is defined by the reception time of the first pulse P1 of the command signal having the pulse pattern "2Dh". The timing, at which the left and right shutters 411, 412 are closed, is specified by the first pulse P1 of the command signal having the pulse pattern "27h". If the viewer operates the eyewear device 400 to select the second video, the left and right shutters 411, 412 simultaneously open/close in synchronization with the display of the second video. In other words, the opening/closing timing of the left and right shutters 411, 412 delays by a display period of one frame image, in comparison with a case if the first video is selected.

If a command set of the dual display mode is received, the eyewear device 400 changes the operation mode from the previously executed operation mode to the dual display mode a predetermined period after the command signal having the pulse pattern "2Dh", which is initially received (a command signal of the command set for the dual display mode). To prevent malfunction, the command set of the dual display mode is communicated at least five times before the operation mode is changed to the dual display mode. If another command signal (command set) is received, the eyewear device 400 operates under the operation mode defined in the other command signal (command set) a predetermined period after the first pulse of the other command set.

<Switching Operation from Stereoscopic to Dual Display Mode>

The operation of the display device 200 and the eyewear device 400 when the stereoscopic display mode is switched to the dual display mode is described. The following description about the switching operation may be similarly applied to the operation when the stereoscopic display mode is switched to another display mode (second display mode) and when the other display mode (second display mode) is switched to the stereoscopic display mode. For example, if the viewer switches the video from movie contents to other contents than the movie, or if the viewer changes a channel of a program displayed by the display device 200, the display frequency and phase of the frame images by the display device 200 change. In the present implementation, a flicker caused by switched display mode is prevented by the communication of the stop signal, which is performed when the display mode is changed.

Figure 14:
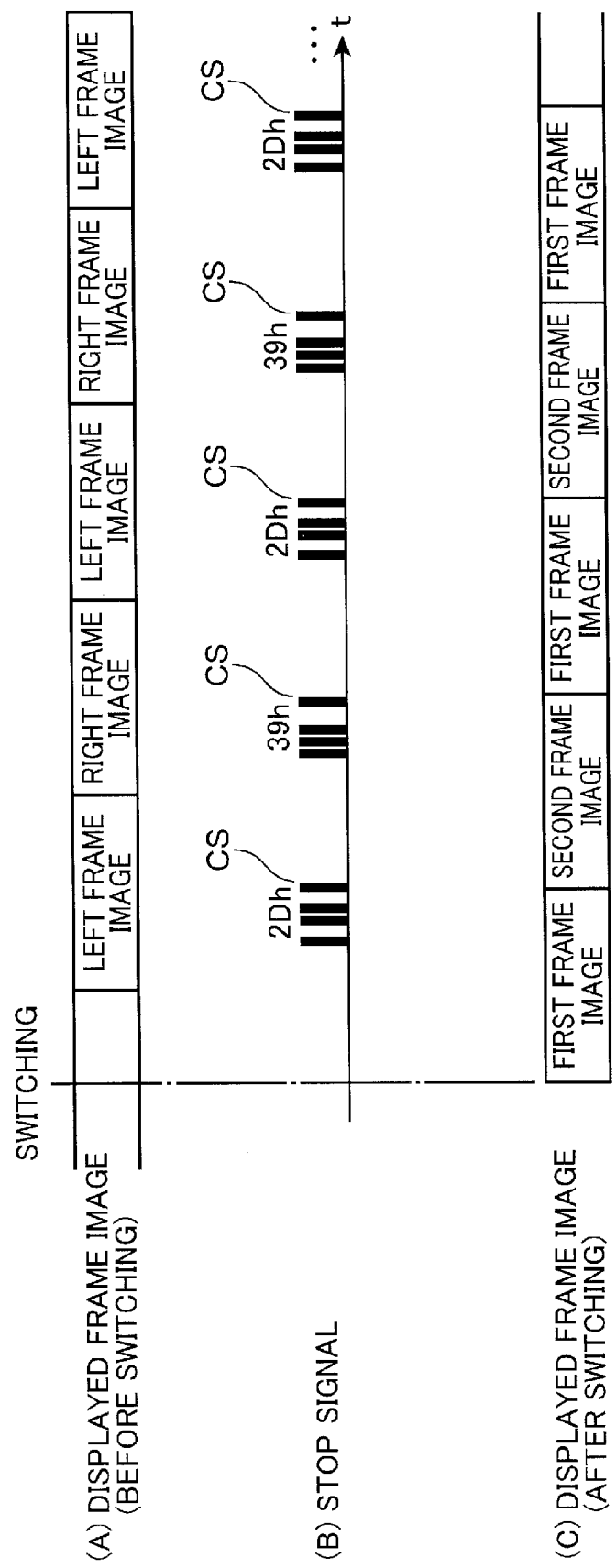
FIG. 14 is a schematic timing chart showing a stop signal transmitted when the display mode is switched from the stereoscopic display mode to the dual display mode.

FIG. 14 is a timing chart showing the stop signals transmitted when the display mode is switched from the stereoscopic display mode to the dual display mode. The stop signals are described with reference to FIGS. 1, 3, 4, 8, 9 and 14.

The section (a) in FIG. 14 shows timings of frame images, which the display portion 215 displays before switching the display mode. The section (c) in FIG. 14 shows frame images, which the display portion 215 displays after switching the display mode. As shown in the sections (a) and (c) in FIG. 14, the display timing of the frame image changes as the display mode is switched.

The section (b) in FIG. 14 shows the stop signals which are transmitted/received as the display mode is switched. If the display mode is switched, the transmitter 225 of the display device 200 transmits the command signal CS having the pulse pattern denoted with the hexadecimal "2Dh" and the command signal CS having the pulse pattern denoted with the hexadecimal "39h". If a pulse pattern of a signal received by the receiver 425 of the eyewear device 400 is a combination of "2Dh" and "39h", the analyzer 462 determines that the stop signal is transmitted. The command signal CS having the pulse pattern "39h" is not used in the stereoscopic and dual display modes. On the other hand, the command signal CS having the pulse pattern "2Dh" is used for both the stereoscopic and dual display modes.

If the command signal having the pulse pattern "39h" is received subsequent to the command signal having the pulse pattern "2Dh", the analyzer 462 of the eyewear device 400 interprets that a condition where the left and right shutters 411, 412 are opened should be maintained.

It should be noted that all the sets of the command signals CS transmitted in the stereoscopic and dual display modes and the command signal CS transmitted as the stop signal, include the command signal CS having the pulse pattern "2Dh". The command signal CS having the pulse pattern "2Dh" is defined as the initially transmitted command signal among all the combinations of the command signals. Consequently, the analyzer 462 of the eyewear device 400 may make various determinations on the basis of the command signal CS having the pulse pattern "2Dh". For example, the analyzer 462 of the eyewear device 400 may determine an operation of the eyewear device 400 in response to a command signal CS, which is transmitted after the command signal CS having the pulse pattern "2Dh". The analyzer 462 of the eyewear device 400 may determine a display cycle (i.e., operation frequency) of the frame image by the display portion 215 in response to the reception cycle of the command signal CS having the pulse pattern "2Dh". Since the signals transmitted under various display modes and the signal transmitted upon switching the display mode include a command signal CS having the common pulse pattern, the determination operation (interpretation of a received signal) of the analyzer 462 of the eyewear device 400 is less susceptible to noises. In the present implementation, the command signal CS having the pulse pattern "2Dh" is exemplified as the common command signal. The command signal having the pulse pattern "39h" is exemplified as the notification command signal to notify stopping of the adjustment operation to the incident light amount.

In the present implementation, for example, the transmitter 225 of the display device 200 transmits the stop signal five times or more. If the receiver 425 receives the stop signal five times, for example, the analyzer 462 of the eyewear device 400 interprets that the left and right shutters 411, 412 should be maintained at the open condition. As a result, the operation of the eyewear device 400 is less susceptible to noise signals.

The transmitter 225 of the display device 200 transmits a command signal CS in conformity with the dual display mode (c.f., FIGS. 8 and 9). If the receiver 425 receives the stop signals five times, for example, the analyzer 462 of the eyewear device 400 interprets that the opening and closing operation of the shutter portion 410 in conformity with the second display mode should be executed.

FIG. 15 is a schematic timing chart showing a change in a transmission pattern of the command signal CS with the switching operation of the display mode from the stereoscopic display mode to the dual display mode. The change in the transmission pattern of the command signal CS is described with reference to FIGS. 8, 14 and 15.

As described with reference to FIG. 8, during the stereoscopic display mode, the command signals CS having the pulse pattern "2Dh" are sequentially transmitted as the left open signal LO at a predetermined cycle "T" corresponding to the operation frequency. The command signals CS having the pulse pattern "33h" is sequentially transmitted as the left close signal LC at the predetermined cycle "T" corresponding to the operation frequency. The command signals CS having the pulse pattern "35h" are sequentially transmitted as the right open signal RO at the predetermined cycle "T" corresponding to the operation frequency. The command signals CS having the pulse pattern "2Bh" are sequentially transmitted as the right close signal RC at the predetermined cycle "T" corresponding to the operation frequency.

As described with reference to FIG. 14, the stop signal is transmitted if the stereoscopic display mode is switched to the dual display mode. The command signal CS of the stop signal having the pulse pattern "2Dh" is transmitted at the cycle "T" after the previous command signal having the pulse pattern "2Dh" is transmitted as the left open signal LO. The command signal CS of the stop signal having the pulse pattern "39h" is transmitted at the cycle "T" after the previous command signal having the pulse pattern "35h" is transmitted as the right open signal RO.

The transmission controller 255 of the display device 200 matches the cyclic transmission pattern of the command signals of the stop signal to the cyclic transmission of the command signal of the timing signals, which are transmitted during the stereoscopic display mode. As described above, the command signal CS of the stop signal having the pulse pattern "2Dh" is used for the timing signal and the stop signal, and the transmission timing of the command signal having the pulse pattern "2Dh" is substantially consistent between the timing signal and the stop signal. Therefore, the eyewear device 400 may appropriately determine whether the signal having the pulse pattern "2Dh" received by the receiver 425 is a noise signal or not. The transmission timing of the command signal CS having the pulse pattern "39h", which is transmitted after the command signal having the pulse pattern "2Dh", also matches with the transmission timing of one of the command signals CS of the timing signal transmitted in the stereoscopic display mode (the command signal CS having the pulse pattern "35h" in the present implementation). Therefore, the analyzer 462 of the eyewear device 400 may similarly determine noises by comparing the reception timing of the command signal CS having the pulse pattern "39h" to the reception timing of the command signal CS received during the stereoscopic display mode.

Under the aforementioned noise determination, the analyzer 462 stores the control data about the appropriately received stop signal in the storage portion 475. Based on the control data about the stop signal in the storage portion 475, the internal signal generator 463 stops the operation of the light amount adjuster 415 (shutter portion 410). As a result, the left and right shutters 411, 412 maintain the open condition and stop.

In response to the display of the frame images in the dual display mode, the transmitter 225 of the display device 200 transmits the timing signals. The analyzer 462 records the control data about the timing signals transmitted during the dual display mode in the storage portion 475. The internal signal generator 463 generates internal signals in response to the newly recorded timing signals (timing signals corresponding to the dual display mode), without using the control data recorded in the storage portion 475 before receiving the stop signals. As a result, the restarted switching operation of the shutter portion 410 appropriately synchronizes with the display of the frame image in the dual display mode.

As described above, in order to prevent an accidental stop operation of the eyewear device 400, the eyewear device 400 executes the stop operation when the stop signals are received continuously for at least five times. If the stop signals are continuously received, the eyewear device 400 shifts from the current operation mode to the stop mode within a predetermined period, from the reference time of the stop command set having "2Dh" that is received first (time at which the first pulse P1 of the command signal having "2Dh" is received). If another command signal is received, the eyewear device 400 shifts to the operation mode defined by the other command signal, within a predetermined period from the reference time of the other command signal.

A command set in the stop mode is transmitted while two frame images (left and right frame images) are displayed. The transmission timing of the stop signal synchronizes with the transmission timing of the command signal, which is transmitted in the previous operation.

In the transmission pattern described with reference to FIG. 15, the command signal of the stop signal having the pulse pattern "2Dh" is transmitted two frame periods after the previous command signal having the pulse pattern "2Dh". Likewise, the command signal of the stop signal having the pulse pattern "39h" is transmitted two frame periods after the previous command signal having the pulse pattern "35h". The reception time of the command signals having the pulse patterns "2Dh", "39h" and "35h" are determined on the basis of the reception time of the first pulse signal P1 of each command signal.

All the command sets include a command signal having the pulse pattern "2Dh". Therefore, if the eyewear device 400 receives the command signal having the pulse pattern "2Dh", the eyewear device 400 may predict receiving the command signal having the pulse pattern "2Dh" again two frame periods later. Likewise, the eyewear device 400 may predict receiving the command signal having the pulse pattern "39h" or another command signal on the basis of the reception time of the previous command signal having the pulse pattern "35h". Consequently, the eyewear device 400 is less susceptible to noises.

The aforementioned principles of the implementations may be applied to a switching operation of other display modes which involve changes (in frequency and/or phase) of the display timing of the frame image.

The aforementioned implementations are merely exemplary. Therefore, the principles of the aforementioned implementations are not limited to the detailed description and accompanying drawings. It should be understood that numerous modifications, combinations and omissions can be made by those skilled in the art without departing from a scope of the principles of the aforementioned implementations.

The aforementioned implementations mainly include the following features.

The display device according to one aspect of the aforementioned implementation switches a display mode between a first display mode for displaying an image, which is stereoscopically perceived by means of an eyewear device that performs an adjustment operation to adjust an incident light amount to a left eye and a right eye, and a second display mode, which is different from the first display mode. The display device includes: a signal generator, which generates a timing signal for notifying a timing of a period to increase the incident light amount to the left and right eyes in the first and second display modes or a stop signal for stopping the adjustment operation, as a control signal to perform the adjustment operation; and a transmitter which transmits the control signal to the eyewear device. The transmitter transmits the timing signal for the first display mode while the image is displayed in the first display mode. If the display mode is then switched from the first display mode to the second display mode, the transmitter transmits the stop signal, and then the timing signal for the second display mode to the eyewear device.

According to the aforementioned configuration, the display device displays a stereoscopic image in the first display mode. The eyewear device performs the adjustment operation to adjust an incident light amount to the left and right eyes and make the displayed image on the display device stereoscopically perceived.

The signal generator of the display device generates the timing signal for notifying a timing of a period to increase the incident light amount to the left and right eyes in the first and second display modes or the stop signal for stopping the adjustment operation, as a control signal to perform the adjustment operation. The display device transmits the control signal to the eyewear device. With liquid crystal shutters, left and right shutters are set to a transparent condition by the stop signal.

While an image is displayed in the first display mode, the transmitter transmits the timing signal. Therefore, a viewer may stereoscopically perceive the image. If the display mode is switched from the first display mode to the second display mode, the transmitter transmits the stop signal. The eyewear device then detects the stop signal so that the viewer is less likely to perceive a flicker, since the left and right shutters of the eyewear device stop at the transparent condition. While the transmitter transmits the stop signal, the eyewear device maintains the transparent condition.

In the aforementioned configuration, each of the timing signals for the first and second display modes may include command signals for controlling the adjustment operation. The stop signal may include a common command signal, which is common with at least one of the command signals, and a notification command signal for notifying the eyewear device of stopping the adjustment operation. The transmitter may transmit the notification command signal subsequent to the common command signal when the transmitter transmits the stop signal. Several modes (command sets) corresponding to the command signals may be provided to the eyewear device as well. The initial command signal of the command sets may be used as the common command signal to specify an operation of the eyewear device.

According to the aforementioned configuration, each of the timing signals for the first and second display modes may include command signals for controlling the adjustment operation. The stop signal may include a common command signal, which is common with at least one of the command signals, and a notification command signal for notifying the eyewear device of stopping the adjustment operation. The transmitter may transmit the notification command signal subsequent to the common command signal. Accordingly, it becomes less likely that the stop signal is erroneously determined as a noise signal. The timing signal and the stop signal may include the common command signal. Therefore, the eyewear device may easily determine an operational frequency on the basis of the common command signal.

In the aforementioned configuration, the transmitter may transmit the common command signal of the stop signal in an equivalent cycle to a transmission cycle of the common command signal included in the command signals for the first display mode. The stop signal may be transmitted every two frames. The transmit timing of the stop signal synchronizes with the previously transmitted command signal. The stop signal may be specified by the command signal having the pulse pattern "2Dh" and the command signal having the pulse pattern "39h". Unless the command signals having the pulse patterns "2Dh" and "39h" are received within two frame periods (one left frame period and one right frame period), it may be regarded that the stop signal is invalid.

In order to prevent erroneous reception of the stop command (e.g., to avoid disturbance (noise) such as infrared rays from fluorescent lamps and sunlight or other radio waves although it depends on viewing environments), the stop command may be determined, for example, on the basis of control data from several cycles, without immediate response of liquid crystal shutters to the control data of the stop command. Therefore, according to the aforementioned configuration, the transmitter may transmit the common command of the stop signal in the same cycle as the transmission cycle of the common command signal included in the command signals for the first display mode. Accordingly, it becomes less likely that the stop signal is erroneously determined as a noise signal.

In the aforementioned configuration, the transmitter may transmit the notification command signal of the stop signal in an equivalent cycle to another command signal than the common command signal which is included in the command signals for the first display mode.

According to the aforementioned configuration, the transmitter may transmit the notification command signal of the stop signal in the same cycle as another command signal than the common command signal, which is included in the command signals for the first display mode. Therefore, it becomes less likely that the stop signal is erroneously determined as a noise signal.

In the aforementioned configuration, the command signals for the first display mode may include a left increase signal for increasing the incident light amount to the left eye, a left decrease signal for decreasing the incident light amount to the left eye, a right increase signal for increasing the incident light amount to the right eye, and a right decrease signal for decreasing the incident light amount to the right eye. The common command signal may be one of the left increase signal, the left decrease signal, the right increase signal and the right decrease signal.

According to the aforementioned configuration, the command signals for the first display mode may include the left increase signal for increasing the incident light amount to the left eye, the left decrease signal for decreasing the incident light amount to the left eye, the right increase signal for increasing the incident light amount to the right eye, and the light decrease signal for decreasing the incident light amount to the right eye. The common command signal may be one of the left increase signal, the left decrease signal, the right increase signal, and the right decrease signal. Therefore, it becomes less likely that the stop signal is erroneously determined as a noise signal. The timing signal and the stop signal may include the same signal. Accordingly, the eyewear device may easily identify an operation frequency on the basis of the same signal.

In the aforementioned configuration, the common command signal equals to an initially transmitted one of the left increase signal, the left decrease signal, the right increase signal and the right decrease signal.

According to the aforementioned configuration, the common command signal may be an initially transmitted one of the left increase signal, the left decrease signal, the right increase signal, and the right decrease signal. Therefore, the eyewear device may easily identify an operation frequency.

In the aforementioned configuration, the common command signal, which has an equivalent waveform to one of the left and right increase signals, may be transmitted in an equivalent cycle to the one of the left and right increase signals. The notification command signal may be transmitted in an equivalent cycle as the other of the left and right increase signals.

According to the aforementioned configuration, the common command signal may have the same waveform as one of the left and right increase signals. The common command signal may be transmitted in the same cycle as the one of the left and right increase signals. The notification command signal may be transmitted in the same cycle as the other of the left and right increase signals. Therefore, the eyewear device may detect the stop signal under little influence of noises.

In the aforementioned configuration, the timing signal for the second display mode may include the common command signal.

According to the aforementioned configuration, the timing signal for the second display mode may include the common command signal. Thus, the common command signal may be used among the timing signals for the first and second display modes and the stop signal. Therefore, the eyewear device may determine an operation mode with reference to the common command signal.

In the aforementioned configuration, the transmitter may repeatedly transmit the stop signals at least five times.

According to the aforementioned configuration, the transmitter may repeatedly transmit the stop signals at least five times. Therefore, it becomes less likely that the stop signal is erroneously determined as a noise signal.

In the aforementioned configuration, each of the first and second display modes may be a stereoscopic image display mode in which a left frame image observed with the left eye and a right frame image observed with the right eye are alternately displayed. The second display mode may be different in a phase of a display timing of the left and right frame images from the first display mode.

According to the aforementioned configuration, each of the first and second display modes may be a stereoscopic image display mode in which a left frame image observed with the left eye and a right frame image observed with the right eye are alternately displayed. The second display mode may be different in a phase of a display timing of the left and right frame images from the first display mode. The transmitter may transmit the stop signal, and then the eyewear device may detect the stop signal to stop the left and right shutters of the eyewear device at a transparent condition. Therefore, regardless the phase difference of the display timings of the cyclic frame images between the first and second display modes, a viewer is less likely to perceive a flicker when the first display mode is switched to the second display mode.

In the aforementioned configuration, each of the first and second display modes may be a stereoscopic image display mode in which a left frame image observed with the left eye and a right frame image observed with the right eye are alternately displayed. The second display mode may be different in a frame rate from the first display mode.

According to the aforementioned configuration, each of the first and second display modes may be a stereoscopic image display mode in which a left frame image observed with the left eye and a right frame image observed with the right eye are alternately displayed. The second display mode may be different in a frame rate from the first display mode. The transmitter may transmit the stop signal, and then the eyewear device may detect the stop signal to stop the left and right shutters of the eyewear device at a transparent condition. Therefore, regardless the frame rate difference, a viewer is less likely to perceive a flicker when the first display mode is switched to the second display mode.

In the aforementioned configuration, the first display mode may be a stereoscopic image display mode in which a left frame image observed with the left eye and a right frame image observed with the right eye are alternately displayed. The second display mode may be a display mode in which a first frame image and a second frame image that are different in contents from each other are alternately displayed. The second display mode to display the first and second frame images is different in a phase from a display timing of the first display mode to display the left and right frame images.

According to the aforementioned configuration, the first display mode is a stereoscopic image display mode in which a left frame image observed with the left eye and a right frame image observed with the right eye are alternately displayed. The second display mode may be a display mode in which first and second frame images that are different in contents are alternately displayed. The second display mode to display the first and second frame images may be different in a phase from a display timing of the first display mode to display the left and right frame images. The transmitter may transmit the stop signal, and then the eyewear device may detect the stop signal to stop the left and right shutters of the eyewear device at a transparent condition. Therefore, regardless the phase difference of the display timings of the cyclic frame images between the first and second display modes, a viewer is less likely to perceive a flicker when the first display mode is switched to the second display mode.

In the aforementioned configuration, the first display mode may be a stereoscopic image display mode in which a left frame image observed with the left eye and a right frame image observed with the right eye are alternately displayed. The second display mode may be a display mode in which a first frame image and a second frame image that are different in contents from each other are alternately displayed. The second display mode to display the first and second frame images may be different in a frame rate from the first display mode.

According to the aforementioned configuration, the first display mode may be a stereoscopic image display mode in which a left frame image observed with the left eye and a right frame image observed with the right eye are alternately displayed. The second display mode may be a display mode in which first and second frame images that are different in contents from each other are alternately displayed. The second display mode to display the first and second frame images may be different in a frame rate from the first display mode. The transmitter may transmit the stop signal, and then the eyewear device may detect the stop signal to stop the left and right shutters of the eyewear device at a transparent condition. Therefore, regardless the frame rate difference, the viewer is less likely to perceive a flicker when the first display mode is switched to the second display mode.

The eyewear device according to another aspect of the aforementioned implementation includes: a light amount adjuster configured to perform an adjustment operation for adjusting an incident light amount, which is an image light amount that enters a left eye and a right eye from a display device; a receiver which receives a control signal for controlling the adjustment operation; and a controller which controls the light amount adjuster in response to the control signal. The control signal includes a timing signal for notifying a timing of a period to increase the incident light amount to the left and right eyes or a stop signal for stopping the adjustment operation. The controller controls the adjustment operation of the light amount adjuster in response to the timing signal if the receiver receives the timing signal. The controller stops the adjustment operation if the receiver receives the stop signal. The receiver receives the timing signal for a first display mode while the image is displayed in the first display mode by the display device, and then if the display device switches an image display mode to a second display mode which is different from the first display mode, the receiver receives the stop signal, and then the timing signal for the second display mode.

According to the aforementioned configuration, the controller controls the light amount adjuster in response to the control signal received by the receiver. The light amount adjuster performs an adjustment operation to adjust an incident light amount, which is an image light amount that enters a left eye and a right eye from a display device under the control of the controller.

The control signal includes the timing signal for notifying a timing of a period to increase the incident light amount or the stop signal for stopping the adjustment operation. If the receiver receives the timing signal, the controller controls the adjustment operation of the light amount adjuster in response to the timing signal. If the receiver receives the stop signal, the controller stops the adjustment operation. The receiver receives the timing signal for the first display mode while the image is displayed in the first display mode by the display device. If the display device switches the image display mode to the second display mode, which is different from the first display mode, the receiver receives the stop signal and then the timing signal for the second display mode. After the eyewear device detects the stop signal, the left and right shutters of the eyewear device may stop at a transparent condition. Accordingly, a viewer may not perceive a flicker.

In the aforementioned configuration, the eyewear device may further include: a data generator which generates timing data about an increasing period to increase the incident light amount in response to the timing signal for the first or second display mode; and a determination portion which determines the increasing period in response to the timing data. If the receiver receives the timing signal for the second display mode, the determination portion may ignore the timing data generated in response to the timing signal for the first display mode, and determine the increasing period in response to the timing data generated from the timing signal for the second display mode.

According to the aforementioned configuration, the data generator may generate the timing data about the increasing period to increase the incident light amount in response to the timing signal for the first or second display mode. The determination portion may determine the increasing period in response to the timing data. If the receiver receives the timing signal for the second display mode, the determination portion may ignore the timing data generated in response to the timing signal for the first display mode, and determine the timing of the increasing period on the basis of the timing data generated from the timing signal for the second display mode. Therefore, after the stop signal is received, the light amount adjuster is controlled under little influence of the timing data before the reception of the stop signal. Consequently, the adjustment operation of the light amount adjuster may quickly synchronize with the image display.

In the aforementioned configuration, during a non-reception period in which the receiver receives neither the timing signal nor the stop signal from the display device, the controller may control the light amount adjuster based on the timing signals which are received repeatedly a predetermined times immediately before the non-reception period.

According to the aforementioned configuration, during a non-reception period in which the receiver receives neither the timing signal nor the stop signal from the display device, the controller may control the light amount adjuster on the basis of the timing signals received repeatedly a predetermined times immediately before the non-reception period. Therefore, the light amount adjuster may continue the adjustment operation in synchronization with the image display during the non-reception period.

In the aforementioned configuration, if the receiver receives the stop signal, the controller may stop the adjustment operation so as to maintain a condition where the incident light amounts to the left and right eyes are simultaneously increased.

According to the aforementioned configuration, if the receiver receives the stop signal, the controller may stop the adjustment operation so as to maintain a condition where the incident light amounts to the left and right eyes are simultaneously increased. Therefore, a view field of a viewer may be ensured even if the adjustment operation is stopped.

In the aforementioned configuration, if the non-reception period exceeds a threshold period, which is determined for the non-reception period, the controller may stop the adjustment operation so as to maintain a condition where the incident light amounts to the left and right eyes are simultaneously increased.

According to the aforementioned configuration, if the non-reception period exceeds a threshold period, the controller may stop the adjustment operation so as to maintain a condition where the incident light amounts to the left and right eyes are simultaneously increased. As a result, there may not be an excessively large timing gap between the adjustment operation of the light amount adjuster on the basis of the timing data, which are generated from the timing signal in the first display mode, and the image display. Therefore, the timing gap between the adjustment operation of the light amount adjuster and the image display is less likely to cause a flicker.

In the aforementioned configuration, if the receiver receives the stop signal after the non-reception period, the controller may stop the adjustment operation so as to maintain a condition where the incident light amounts to the left and right eyes eye are simultaneously increased.

According to the aforementioned configuration, if the receiver receives the stop signal after the non-reception period, the controller may stop the adjustment operation so as to maintain a condition where the incident light amounts to the left and right eyes are simultaneously increased. Therefore, a view field of a viewer may be ensured even if the adjustment operation is stopped.

In the aforementioned configuration, each of the timing signals for the first and second display modes may include command signals for controlling the adjustment operation. The stop signal may include a common command signal, which is common with at least one of the command signals, and a notification command signal for notifying the eyewear device of stopping the adjustment operation. The receiver may receive the common command signal of the stop signal in an equivalent cycle to a transmission cycle of the common command signal included in the command signals for the first display mode. If the receiver receives a signal group which includes a signal having an equivalent waveform to the common command signal and a signal having an equivalent waveform to the notification command signal, the controller may determine whether the signal group received by the receiver is a noise based on the transmission cycle of the common command signal received in the first display mode.

According to the aforementioned configuration, each of the timing signals for the first and second display modes may include command signals for controlling the adjustment operation. The stop signal may include a common command signal, which is common with at least one of the command signals, and the notification command signal for notifying the eyewear device of stopping the adjustment operation. The receiver may receive the common command signal of the stop signal in the same cycle as the transmission cycle of the common command signal included in the command signals for the first display mode. If the receiver receives a signal group, which includes a signal having the same waveform as the common command signal and a signal having the same waveform as the notification command signal, the controller determines whether the signal group received by the receiver is a noise on the basis of the transmission cycle of the common command signal received in the first display mode. Therefore, the eyewear device is less likely to erroneously stop.

The video system according to yet another aspect of the aforementioned implementation includes: an eyewear device which performs an adjustment operation to adjust an incident light amount to a left eye and a right eye; and a display device which switches a display mode between a first display mode for displaying an image that is stereoscopically perceived and a second display mode that is different from the first display mode. The display device includes: a signal generator which generates a timing signal for notifying a timing of a period to increase the incident light amount to the left and right eyes in the first and second display modes or a stop signal for stopping the adjustment operation, as a control signal to perform the adjustment operation; and a transmitter which transmits the control signal to the eyewear device. While the image is displayed in the first display mode, the transmitter transmits the timing signal for the first display mode. When the display mode is switched from the first display mode to the second display mode, the transmitter transmits the stop signal, and then the timing signal for the second display mode to the eyewear device. The eyewear device includes: a light amount adjuster for performing the adjustment operation to adjust the incident light amount, which is an image light amount that enters the left and right eyes from the display device; a receiver which receives the control signal for controlling the adjustment operation; and a controller which controls the light amount adjuster in response to the control signal. The controller controls the adjustment operation of the light amount adjuster in response to the timing signal if the receiver receives the timing signal. The controller stops the adjustment operation if the receiver receives the stop signal. The receiver receives the timing signal for the first display mode while the image is displayed in the first display mode by the display device, and then if the display device switches an image display mode to the second display mode which is different from the first display mode, the receiver receives the stop signal, and then the timing signal for the second display mode.

According to the aforementioned configuration, the eyewear device of the video system performs an adjustment operation to adjust the incident light amount to the left and right eyes. The display device of the video system switches a display mode between the first display mode for displaying stereoscopic images and the second display mode which is different from the first display mode.

The signal generator of the display device generates the timing signal for notifying a timing of a period to increase the incident light amount to the left and right eyes in the first and second display modes or the stop signal for stopping the adjustment operation as a control signal to perform the adjustment operation. The display device transmits the control signal to the eyewear device. The transmitter transmits the timing signal while the image is displayed in the first display mode. Therefore, a viewer may stereoscopically perceive the image. If the display mode is switched from the first display mode to the second display mode, the transmitter transmits the stop signal.

The controller of the eyewear device controls the light amount adjuster in response to the control signal received by the receiver. Under the control of the controller, the light amount adjuster performs the adjustment operation to adjust the incident light amount, which is an image light amount that enters the left and right eyes from the display device. If the receiver receives the timing signal, the controller controls the adjustment operation of the light amount adjuster in response to the timing signal. If the receiver receives the stop signal, the controller stops the adjustment operation. The receiver receives the timing signal for the first display mode while the image is displayed in the first display mode by the display device. If the display device switches the image display mode to the second display mode, which is different from the first display mode, the receiver receives the stop signal, and then the timing signal for the second display mode. After the eyewear device detects the stop signal, the left and right shutters of the eyewear device stop and maintain a transparent condition. Accordingly, the viewer is less likely to perceive a flicker.

INDUSTRIAL APPLICABILITY

The principles of the aforementioned implementations may be suitably applied to a display device designed to switch a display mode, an eyewear device designed to assist in viewing images displayed by the display device, and a video system including these devices.

The invention claimed is:

1. A display device for switching a display mode between a first display mode for displaying an image, which is stereoscopically perceived by means of an eyewear device that performs an adjustment operation to adjust an incident light amount to a left eye and a right eye, and a second display mode which is different from the first display mode, the display device comprising:
a signal generator which generates a control signal to perform the adjustment operation, the control signal including a timing signal for notifying a timing of a period to increase the incident light amount to the left and right eyes in the first and second display modes or a stop signal for stopping the adjustment operation; and
a transmitter which transmits the control signal to the eyewear device, wherein,
while the image is displayed in the first display mode, the transmitter transmits the timing signal for the first display mode, and
when the display mode is switched from the first display mode to the second display mode, the transmitter transmits the stop signal to the eyewear device and then transmits the timing signal for the second display mode to the eyewear device.

2. The display device according to claim 1, wherein
the timing signal for the first and second display modes includes command signals for controlling the adjustment operation,
the stop signal includes a common command signal, which is common with at least one of the command signals, and a notification command signal for notifying the eyewear device of stopping the adjustment operation, and
the transmitter transmits the notification command signal subsequent to the common command signal when the transmitter transmits the stop signal.

3. The display device according to claim 2, wherein
the transmitter transmits the common command signal of the stop signal in an equivalent cycle to a transmission cycle of the common command signal included in the command signals for the first display mode.

4. The display device according to claim 2, wherein
the transmitter transmits the notification command signal of the stop signal in an equivalent cycle to a command signal other than the common command signal which is included in the command signals for the first display mode.

5. The display device according to claim 2, wherein
the command signals for the first display mode include a left increase signal for increasing the incident light amount to the left eye, a left decrease signal for decreasing the incident light amount to the left eye, a right increase signal for increasing the incident light amount to the right eye, and a right decrease signal for decreasing the incident light amount to the right eye, and
the common command signal is one of the left increase signal, the left decrease signal, the right increase signal and the right decrease signal.

6. The display device according to claim 5, wherein
the common command signal is equal to an initially transmitted one of the left increase signal, the left decrease signal, the right increase signal and the right decrease signal.

7. The display device according to claim 6, wherein
the common command signal, which has an equivalent waveform to one of the left and right increase signals, is transmitted in an equivalent cycle to the one of the left and right increase signals, and
the notification command signal is transmitted in an equivalent cycle as another of the left and right increase signals.

8. The display device according to claim 2, wherein
the timing signal for the second display mode includes the common command signal.

9. The display device according to claim 1, wherein
the transmitter repeatedly transmits the stop signal at least five times.

10. The display device according to claim 1, wherein
each of the first and second display modes is a stereoscopic image display mode in which a left frame image observed with the left eye and a right frame image observed with the right eye are alternately displayed, and
the second display mode is different in a phase of a display timing of the left and right frame images from the first display mode.

11. The display device according to claim 1, wherein
each of the first and second display modes is a stereoscopic image display mode in which a left frame image observed with the left eye and a right frame image observed with the right eye are alternately displayed, and
the second display mode is different in a frame rate from the first display mode.

12. The display device according to claim 1, wherein
the first display mode is a stereoscopic image display mode in which a left frame image observed with the left eye and a right frame image observed with the right eye are alternately displayed, the second display mode is a display mode in which a first frame image and a second frame image that are different in contents from each other are alternately displayed, and the second display mode to display the first and second frame images is different in a phase from a display timing of the first display mode to display the left and right frame images.

13. The display device according to claim 1, wherein the first display mode is a stereoscopic image display mode in which a left frame image observed with the left eye and a right frame image observed with the right eye are alternately displayed, the second display mode is a display mode in which a first frame image and a second frame image that are different in contents from each other are alternately displayed, and the second display mode to display the first and second frame images is different in a frame rate from the first display mode.

14. An eyewear device, comprising:

a light amount adjuster configured to perform an adjustment operation for adjusting an incident light amount, which is an image light amount that enters a left eye and a right eye from a display device;

a receiver which receives, from a display device, a control signal for controlling the adjustment operation; and a controller which controls the light amount adjuster in response to the control signal, wherein the control signal includes a timing signal for notifying a timing of a period to increase the incident light amount to the left and right eyes or a stop signal for stopping the adjustment operation, the controller controls the adjustment operation of the light amount adjuster in response to the timing signal when the receiver receives the timing signal, the controller stops the adjustment operation when the receiver receives the stop signal, and the receiver receives the timing signal for a first display mode while an image is displayed in the first display mode by the display device, and then, when the display device switches an image display mode to a second display mode which is different from the first display mode, the receiver receives the stop signal, and then receives the timing signal for the second display mode.

15. The eyewear device according to claim 14, further comprising:

a data generator which generates timing data about an increasing period to increase the incident light amount in response to the timing signal for the first or second display modes; and a determination portion which determines the increasing period in response to the timing data, wherein, when the receiver receives the timing signal for the second display mode, the determination portion ignores the timing data, which is received before the reception of the stop signal and generated in response to the timing signal for the first display mode, and determines the increasing period in response to the timing data generated from the timing signal for the second display mode.

16. The eyewear device according to claim 14, wherein, during a non-reception period in which the receiver receives neither the timing signal nor the stop signal from the display device, the controller controls the light amount adjuster based on the timing signals which are received repeatedly a predetermined number of times immediately before the non-reception period.

17. The eyewear device according to claim 16, wherein, when the non-reception period exceeds a threshold period, which is determined for the non-reception period, the controller stops the adjustment operation so as to maintain a condition where the incident light amount to the left eye and the incident light amount to the right eye are simultaneously increased.

18. The eyewear device according to claim 16, wherein, when if the receiver receives the stop signal after the non-reception period, the controller stops the adjustment operation so as to maintain a condition where the incident light amount to the left eye and the incident light amount to the right eye are simultaneously increased.

19. The eyewear device according to claim 14, wherein, when the receiver receives the stop signal, the controller stops the adjustment operation so as to maintain a condition where the incident light amount to the left eye and the incident light amount to right eye are simultaneously increased.

20. The eyewear device according to claim 14, wherein the timing signal for the first and second display modes includes command signals for controlling the adjustment operation, the stop signal includes a common command signal, which is common with at least one of the command signals, and a notification command signal for notifying the eyewear device of stopping the adjustment operation, the receiver receives the common command signal of the stop signal in an equivalent cycle to a transmission cycle of the common command signal included in the command signals for the first display mode, and when the receiver receives a signal group which includes a signal having an equivalent waveform to the common command signal, and a signal having an equivalent waveform to the notification command signal, the controller determines whether the signal group received by the receiver is a noise based on the transmission cycle of the common command signal received in the first display mode.

21. A video system, comprising:

an eyewear device which performs an adjustment operation to adjust an incident light amount to a left eye and a right eye; and a display device which switches a display mode between a first display mode for displaying an image that is stereoscopically perceived and a second display mode that is different from the first display mode, wherein the display device includes:

a signal generator which generates a control signal to perform the adjustment operation, the control signal including a timing signal for notifying a timing of a period to increase the incident light amount to the left and right eyes in the first and second display modes or a stop signal for stopping the adjustment operation; and a transmitter which transmits the control signal to the eyewear device, while the image is displayed in the first display mode, the transmitter transmits the timing signal for the first display mode, when the display mode is switched from the first display mode to the second display mode, the transmitter transmits the stop signal to the eyewear device, and then transmits the timing signal for the second display mode to the eyewear device, the eyewear device includes:
- a light amount adjuster for performing the adjustment operation to adjust the incident light amount, which is an image light amount that enters the left and right eyes from the display device;
- a receiver which receives the control signal for controlling the adjustment operation; and
- a controller which controls the light amount adjuster in response to the control signal, the controller controls the adjustment operation of the light amount adjuster in response to the timing signal when the receiver receives the timing signal, the controller stops the adjustment operation when the receiver receives the stop signal, and the receiver receives the timing signal for the first display mode while the image is displayed in the first display mode by the display device, and then, when the display device switches the display mode to the second display mode which is different from the first display mode, the receiver receives the stop signal, and then receives the timing signal for the second display mode.

\* \* \* \* \*